United States Patent
Narayanaswamy et al.

(10) Patent No.: US 9,447,332 B2
(45) Date of Patent: *Sep. 20, 2016

(54) CONVERSION OF PLASTICS TO OLEFIN AND AROMATIC PRODUCTS USING TEMPERATURE CONTROL

(71) Applicant: Saudi Basic Industries Corporation, Riyadh (SA)

(72) Inventors: Ravichander Narayanaswamy, Bangalore (IN); Krishna Kumar Ramamurthy, Bangalore (IN); P. S. Sreenivasan, Bangalore (IN)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,923

(22) Filed: Feb. 12, 2013

(65) Prior Publication Data

US 2014/0228605 A1    Aug. 14, 2014

(51) Int. Cl.
*C10G 1/10* (2006.01)
*C10G 1/08* (2006.01)
(Continued)

(52) U.S. Cl.
CPC ............... *C10G 1/10* (2013.01); *B01J 8/0055* (2013.01); *B01J 8/1836* (2013.01); *B01J 8/1863* (2013.01);
(Continued)

(58) Field of Classification Search
CPC ............ C07C 4/00; C07C 4/02; C07C 4/06; C07C 11/00; C07C 11/02; C07C 11/04; C07C 11/06; C10G 1/00; C10G 1/10; C10G 51/00; C10G 51/02; C10G 51/023; C10G 51/026; C10G 51/04; C10G 57/00; C10G 55/02; C10G 55/04; C10G 55/06; C10G 65/00; C10G 65/10; C10G 65/12; C10G 69/00; C10G 69/02; C10G 69/04; C10G 69/06

USPC ....... 585/240, 241, 317, 319, 324, 329, 330, 585/408, 410, 648, 650, 651
See application file for complete search history.

(56) References Cited

U.S. PATENT DOCUMENTS 4,092,722 A *  5/1978  Hofferber et al. ............ 700/273
4,746,406 A    5/1988  Timmann
(Continued)

FOREIGN PATENT DOCUMENTS

CA    1050956    3/1979
CN    1246510    3/2000
(Continued)

OTHER PUBLICATIONS

Shaw, John., Process Plant Equipment : Operation, Control, and Reliability—Chapter 21 Process Control, John Wiley & Sons, Inc., 2012, pp. 619-634.*
(Continued)

*Primary Examiner* — In Suk Bullock
*Assistant Examiner* — Philip Louie
(74) *Attorney, Agent, or Firm* — Paul I. Herman; Grady K. Bergen; Griggs Bergen LLP

(57) ABSTRACT

A method of producing olefins and aromatic compounds from a feedstock includes introducing a hydrocarbon feedstock and a catalyst composition that is suitable for converting the feedstock to at least one of olefins and aromatic compounds within a reactor. The reactor has a reactor flow path having a length L between the inlet and outlet. The temperature in the reactor is monitored in at least one location that is at or adjacent to the inlet at a temperature-monitoring distance that is from 0.3 L or less from the inlet. In response to the monitored temperatures one or more parameters are modified. At least a portion of the feedstock is allowed to be converted to at least one of olefins and aromatic compounds within the reactor, which are removed as a product stream.

28 Claims, 9 Drawing Sheets

(51) Int. Cl.
*B01J 29/80* (2006.01)
*C10G 11/18* (2006.01)
*B01J 8/18* (2006.01)
*B01J 8/26* (2006.01)
*B01J 8/00* (2006.01)

(52) U.S. Cl.
CPC .. *B01J 8/26* (2013.01); *C10G 1/08* (2013.01); *C10G 1/086* (2013.01); *C10G 11/187* (2013.01); *B01J 2208/00044* (2013.01); *B01J 2208/00061* (2013.01); *B01J 2219/00198* (2013.01); *B01J 2219/00218* (2013.01); *B01J 2219/00231* (2013.01); *C10G 2400/20* (2013.01); *C10G 2400/22* (2013.01); *C10G 2400/30* (2013.01)

(56) References Cited

U.S. PATENT DOCUMENTS

| | | |
|---|---|---|
| 4,851,601 A | 7/1989 | Fukuda |
| 4,871,426 A | 10/1989 | Lechert |
| 4,941,952 A | 7/1990 | Betz |
| 5,079,385 A | 1/1992 | Wu |
| 5,136,117 A | 8/1992 | Paisley |
| 5,354,930 A | 10/1994 | Atkins |
| 5,364,995 A | 11/1994 | Kirkwood |
| 5,447,622 A | 9/1995 | Kerby et al. |
| 5,481,052 A | 1/1996 | Hardman |
| 5,744,668 A | 4/1998 | Zhou |
| 5,821,395 A | 10/1998 | Price |
| 6,797,155 B1 | 9/2004 | Chester et al. |
| 6,866,830 B2 | 3/2005 | Kwak |
| 7,122,493 B2 | 10/2006 | Ou et al. |
| 7,932,424 B2 | 4/2011 | Fujimoto |
| 7,976,696 B2 | 7/2011 | Ying |
| 7,981,273 B2 | 7/2011 | Nicholas |
| 8,007,663 B2 | 8/2011 | Ying |
| 8,008,223 B2 | 8/2011 | Garcia-Martinez |
| 2002/0191732 A1 | 12/2002 | Ruottu et al. |
| 2005/0239634 A1 | 10/2005 | Ying |
| 2007/0173673 A1 | 7/2007 | Fujimoto |
| 2008/0035528 A1 | 2/2008 | Marker |
| 2009/0069610 A1* | 3/2009 | Roberts, IV ........... C10G 45/58 585/24 |
| 2009/0227823 A1 | 9/2009 | Huber |
| 2010/0210782 A1 | 8/2010 | Fader |
| 2010/0212215 A1 | 8/2010 | Agblevor |
| 2011/0127193 A1 | 6/2011 | Xie |
| 2011/0154720 A1 | 6/2011 | Bartek |
| 2011/0163002 A1 | 7/2011 | White et al. |
| 2011/0166397 A1 | 7/2011 | Fujimoto |
| 2011/0178347 A1 | 7/2011 | Feugnet |
| 2011/0207979 A1 | 8/2011 | Kim |
| 2011/0207984 A1 | 8/2011 | Almeida |
| 2012/0203042 A1* | 8/2012 | Huber et al. ................. 585/241 |
| 2013/0204054 A1* | 8/2013 | Bartek et al. ................. 585/240 |

FOREIGN PATENT DOCUMENTS

| | | |
|---|---|---|
| CN | 1462790 | 12/2003 |
| DE | 4329434 A1 | 3/1995 |
| DE | 4417386 A1 | 3/1995 |
| DE | 4413093 A1 | 11/1995 |
| EP | 124716 A2 | 11/1984 |
| EP | 297408 A2 | 1/1989 |
| EP | 502618 A1 | 9/1992 |
| EP | 659867 A2 | 6/1995 |
| EP | 2027918 A1 | 2/2005 |
| EP | 2334759 A1 | 6/2011 |
| EP | 2351820 A2 | 8/2011 |
| EP | 2364342 A1 | 9/2011 |
| JP | 57121093 A | 7/1982 |
| JP | 57209988 A | 12/1982 |
| JP | 9221681 A | 8/1997 |
| JP | 2000095894 A | 4/2000 |
| JP | 2001316517 A | 11/2001 |
| JP | 2002088375 A | 3/2002 |
| JP | 2002121318 A | 4/2002 |
| JP | 2003105125 A | 4/2003 |
| JP | 2003119472 A | 4/2003 |
| JP | 2003654858 B2 | 6/2005 |
| JP | 2005154510 A | 6/2005 |
| JP | 2005154517 A | 6/2005 |
| TW | 265174 B | 11/2006 |
| TW | 200720329 A | 6/2007 |
| WO | 8700082 | 1/1987 |
| WO | 9424228 A1 | 10/1994 |
| WO | 9718892 A1 | 5/1997 |
| WO | 0066656 A1 | 11/2000 |
| WO | 0105908 A1 | 1/2001 |
| WO | 03010258 A1 | 2/2003 |
| WO | 03012009 A1 | 2/2003 |
| WO | 2005094990 A1 | 10/2003 |
| WO | 2005061673 | 7/2005 |
| WO | 2007086348 A1 | 8/2007 |
| WO | 2008126040 A2 | 10/2008 |
| WO | 2011103026 A1 | 8/2011 |
| WO | 2011103697 A1 | 9/2011 |
| WO | 2011115785 A1 | 9/2011 |

OTHER PUBLICATIONS

Wahl et al., A Scheme for Whole Temperature Profile Control in Distributed Parameter Systems, European Symposium on Computer Aided Process Engineering—12, Elsevier Science, 2002, p. 577 to 582.*

Harris et al., Optimal Sensor Location with an Application to a Packed Bed Tubular Reactor, AIChE Journal, vol. 26, No. 6, Nov. 1980, p. 910-916.*

Manos et al., Catalytic degradation of high-density polyethylene over different zeolitic structures, Ind. Eng. Chem. Res. 2000, vol. 39, pp. 1198-1202.*

W. Kaminsky, et al., Pyrolysis of plastics waste and old pneumatic tyres in a fluidization reactor, Materiaux Techn., 1978, pp. 146-153, vol. 66, No. 4.

W. Kaminsky, et al.,Raw Materials by Fluidized Bed Pyrolysis of Plastic Wastes and Other Hydrocarbon Containing Materials, Materials and Energy from Refuse, 1981, pp. 9.93-9.100.

W. Kaminsky, et al., Oil and Gas Recovery From Plastics and Sewage Sludge by Pyrolysis in a Fluidized Bed, American Chemical Society, Polymer Preprints, Division of Polymer Chemistry, 1983, p. 438, vol. 24, No. 2.

International Search Report in counterpart International Application No. PCT/IB2013/060828, May 26, 2014, pp. 1-4, received from International Searching Authority.

Written Opinion of the International Searching Authority for counterpart International App. No. PCT/IB2013/060828, May 26, 2014, pp. 1-5, received from International Searching Authority.

A.B. Ross, et al, Development of Pyrolysis-GC with Selective Detection: Coupling of Pyrolysis-GC to Atomic Emission Detection (py-GC-AED), Journal of Analytical and Applied Pyrolysis, 2001, 371-385, vol. 58-59.

W. J. Hall, et al, Fast Pyrolysis of Halogenated Plastics Recovered from Waste Computers, Energy & Fuels, 2006, 1536-1549, vol. 20.

W. Kaminsky, et al, Feedstock Recycling of Polymers by Pyrolysis in a Fluidised Bed, Polymer Degradation and Stability, 2004, 1045-1050, vol. 85.

W. Kaminsky, Feedstock Recycling by Pyrolysis in a Fluidized Bed, Institute for Technical and Macromolecular Chemistry University of Hamburg, Hamburg, Germany.

W.J. Hall, et al, Thermal Processing of Toxic Flame-Retarded Polymers Using a Waste Fluidized Catalytic Cracker (FCC) Catalyst, Energy & Fuels, 2008, 1691-1697, vol. 22, Leeds, United Kingdom.

Paul T. Williams, et al, Fluidised Bed Pyrolysis of Low Density Polyethylene to Produce Petrochemical Feedstock, Journal of Analytical and Applied Pyrolysis, 1999, 107-126, vol. 51 Department of Fuel and Energy, Leeds, United Kingdom.

(56) References Cited

OTHER PUBLICATIONS

C. Wu, et al, Hydrogen Production by Steam Gasification of Polypropylene with Various Nickel Catalysts, Applied Catalysis B: Environmental, 2009, 152-161, vol. 87, Energy & Resources Research Institute, Leeds, United Kingdom.
Walter Kaminsky, et al, Catalytical and Thermal Pyrolysis of Polyolefins, Journal of Analytical and Applied Pyrolysis, 2007, 368-374, vol. 79, University of Hamburg, Institute of Technical and Macromolecular Chemistry, Hamburg, Germany.
J. Mertinkat, et al, Cracking Catalysts Used as Fluidized Bed Material in the Hamburg Pyrolysis Process, Journal of Analytical and Applied Pyrolysis, 1999, 87-95, vol. 49, University of Hamburg, Institute of Technical and Macromolecular Chemistry, Hamburg, Germany.
M. Predel, et al, Pyrolysis of Mixed Polyolefins in a Fluidised-Bed Reactor and on a Pyro-GC/MS to Yield Aliphatic Waxes, 2000, 373-385, vol. 70, Institute of Technical and Macromolecular Chemistry, University of Hamburg, Hamburg, Germany.
W. Kaminsky, et al, Olefins from Polyoflefins and Mixed Plastics by Pyrolysis, Journal of Analytical and Applied Pyrolysis, 1995, 19-27, vol. 32, University of Hamburg, Institute for Technical and Macromolecular Chemistry, Hamburg, Germany.
Gorka Elordi, et al, Products Yields and Compositions in the Continuous Pyrolysis of High-Density Polyethylene in a Conical Spouted Bed Reactor, Industrial & Engineering Chemistry Research, Department of Chemical Engineering, Bilbao, Spain.
C. Wu, et al, Hydrogen Production from the Pyrolysis-Gasification of Polypropylene: Influence of Steam Flow Rate Carrier Gas Flow Rate and Gasification Temperature, Energy Fuels, 2009, 5055-5061, vol. 23, Energy and Resources Research Institute, Leeds, United Kingdom.
M. Olazar, et al, Influence of FCC Catalyst Steaming on HDPE Pyrolsis Product Distribution, Journal of Analytical and Applied Pyrolysis, 2009, 359-365, vol. 85, University of Basque Country, Bilbao, Spain.
A. Lopez, et al, Influence of Time and Temperature on Pyrolysis of Plastic Wastes in a Semi-Batch Reactor, Chemical Engineering Journal, 2011, 62-71, vol. 173, Chemical and Environmental Department, School of Engineering of Bilbao, Bilbao, Spain.
Paul T. Williams, et al, Interaction of Plastics in Mixed-Plastics Pyrolysis, Energy & Fuels, 1999, 188-196, Department of Fuel and Energy, The University of Leeds, Leeds, United Kingdom.
C. Wu, et al, Investigation of Ni—Al, Ni—Mg—Al and Ni—Cu—Al Catalysts for Hydrogen Production from Pyrolysis-Gasification of Polypropylene, Applied Catalysis B: Environmental, 2009, 147-156, vol. 90, Energy & Resources research Institute, The University of Leeds, Leeds, United Kingdom.
C. Wu, et al, Investigation of Coke Formation Ni—Mg—Al Catalyst for Hydrogen Production from the Catalytic Steam Pyrolysis-Gasification of Polypropylene, Applied Catalysis B: Enviromental, 2010, 198-207, vol. 96, Energy & Resources Research Institute, The University of Leeds, Leeds, United Kingdom.
W. Kaminsky, Recycling of Polymer by Pyrolysis, Journal de Physique, 1993, 1543-1552, vol. 3, Institute for Technical and Macromolecular Chemistry, University of Hamburg, Hamburg, Germany.
S. T. Kenny, et al, Up-Cycling of PET to the Biodegradable Plastic PHA, Environ. Sci. Technol., 2008, 7696-7701, vol. 42, Dublin, Republic of Ireland.
J. S. Kim, et al, Pyrolysis of a Fraction of Mixed Plastic Wastes Depleted in PVC, Journal of Analytical and Applied Pyrolysis, 1997, 365-372, vol. 40-41, University of Hamburg, Institute of Technical and Macromolecular Chemistry, Hamburg, Germany.
Roberto Aguado, et al, Kinetic Study of Polyolefin Pyrolysis in a Conical Spouted Bed Reactor, Ind. Eng. Chem. Res., 2002, 4559-4566, vol. 41, Departamento de Ingenieria Quimica, Universidad del Pais Vasco, Bilbao, Spain.

Roberto Aguado, et al, Kinetics of Polystyrene Pyrolysis in a Conical Spouted Bed Reactor, Chemical Engineering Journal, 2003, 91-99, vol. 92, Departamento de Ingenieria Quimica, Universidad del Pais Vasco, Bilbao, Spain.
W. Kaminsky, et al, Pyrolysis of Mixed Plastics into Aromatics, Journal of Analytic and Applied Physics, 1999, 127-134, vol. 51, University of Hamburg, Institute for Technical and Macromolecular Chemisty, Hamburg, Germany.
Roberto Aguado, et al, Defluidization Modelling of Pyrolysis of Plastics in a Conical Spouted Bed Reactor, 2005, 231-235, vol. 44, Departamento de Ingenieria Quimica, Facultad de Ciencias, Universidad del Pais Vasco, Bilbao, Spain.
W. Kaminsky, et al, Monomer Recovery by Pyrolysis of Poly(methyl methacrylate) (PMMA), Journal of Analytical and Applied Pyrolysis, 1991, 311-318, vol. 19, Elsevier Science Publishers B.V., Amsterdam.
Walter Kaminsky, et al, Feedstock Recycling of Synthetic and Natural Rubber by Pyrolysis in a Fluidized Bed, Journal of Analytical and Applied Pyrolysis, 2008, 4, Elsevier, Hamburg, Germany.
M. Artetxe, et al, Operating Conditions for the Pyrolysis of Poly-(ethylene terephthalate) in a Conical Spouted-Bed Reactor, Ind. Eng. Chem. Res., 2010, 2064-2069, vol. 49, University of the Basque Coutnry, Department of Chemical Engineering, Bilbao, Spain.
T. Yoshioka, et al, Pyrolysis of poly(ethylene terephthalate) in a Fluidised Bed Plant, Polymer Degradation and Stability, 2004, 499-504, vol. 86, Environmental Conservation Research INstittue, Tohoku University, Aoba-ku Sendai, Japan.
Walter Kaminsky, et al, Pyrolysis of Filled PMMA for Monomer Recovery, Journal of Analytical and Applied Pyrolysis, 2001,781-787, vol. 58-59, University of Hamburg, Institute for Technical and Macromolecular Chemistry, Hamburg, Germany.
Y.-H. Lin, et al, Fluidised Bed Pyrolysis of Polypropylene Over Cracking Catalysts for Producing Hydrocarbons, Polymer degradation and Stability, 2005, 101-108, vol. 89, Department of Biochemical Engineering & Graduate Institute of Environmental Polymeric Materials, Kao Yuan Institute of Technology, Kaohsiung, Taiwan, ROC.
N. Miskolczi, et al, Production of Oil with Low Organobromine Content from the Pyrolysis of Flame Retarded HIPS and ABS Plastics, Journal of Analytical and Applied Pyrolysis, Department of Hydrocarbon and Coal Processing, University of Pannonia, Veszprem, Hungary.
C. Wu, et al, Pyrolysis-Gasification of Plastics, Mixed Plastics and Real-World Plastic Waste with and without Ni—Mg—Al Catalyst, Fuel, Energy & Resources Research Institute, The University of Leeds, Leeds, United Kingdom.
C. Wu, et al, Pyrolysis-Gasification of Post-Consumer Municipal Solid Plastic Waste for Hydrogen Production, International Journal of Hydrogen Energy, 2010, 949-957, vol. 35, Energy & Resources Institute, The University of Leeds, Leeds, UK.
W. J. Hall, et al Pyrolysis of Brominated Feedstock Plastic in a Fluidised Bed Reactor, Journal of Analytical and Applied Pyrolysis, 2006, 75-82, vol. 77, Energy and Resources Research Institute, University of Leeds, Leeds, UK.
A. M. Cunliffe, et al, Recycling of Fibre-Reinforced Polymeric Waste by Pyrolysis: Thermo-Gravimetric and Bench-Scale Investigation, Journal of Analytical and Applied Pyrolysis, 2003, 315-338, vol. 70, Department of Fuel and Energy, The University of Leeds, Leeds, United Kingdom.
A. Lopez, et al, Pyrolysis of Municipal Plastic Wastes II: Influence of Raw Material Composition Under Catalytic Conditions, Waste Management, 2011, 1973-1983, vol. 31, Chemical and Environmental Engineering Department, School of Engineering of Bilbao, Alda, Urquijo, Bilbao Spain.
A. Lopez, et al, Pyrolysis of Municipal Plastic Wastes: Influence of Raw Material Composition, Waste Management, 2010, 620-627, vol. 30, Chemical and Environmental Engineering Department, School of Engineering of Bilbao, Alda, Urquijo, Bilbao, Spain.

(56) References Cited

OTHER PUBLICATIONS

H. Schmidt, et al, Pyrolysis of Oil Sludge in a Fluidised Bed Reactor, Chemosphere, 2001, 285-290, vol. 45, Institute of Technical and Macromolecular Chemistry, University of Hamburg, Hamburg, Germany.
C. M. Simon, et al. Pyrolysis of Polyolefins with Steam to Yield Olefins, Journal of Analytical and Applied Pyrolysis, 1996, 75-87, vol. 38, University of Hamburg, Institute for Technical and Macromolecular Chemistry, Hamburg, Germany.
I.D. Marco, et al, Pyrolysis of the Rejects of a Waste Packaging Separation and Classification Plant, Journal of Analytical and Applied Pyrolysis, 2009, 384-391, vol. 85, Dpto. Ingenieria Quimica y del Medio Ambiente, Escuela T.S. de Ingenieria, Bilbao, Spain.
I.D. Marco, et al, Recycling of Automobile Shredder Residues by Means of Pyrolysis, Journal of Analytical and Applied Pyrolysis, 2007, 403-408, vol. 79, Dpto. INgenieria Quimica y del Medio Ambientem Escuela Superior de Ingenieroes de Bilbao, Bilbao, Spain.
W. Kaminsky, et al, Recycling of Mixed Plastics by Pyrolysis in a Fluidised Bed, Macromolecular Symposium, 2000, 191-199, vol. 152, Institute of Technical and Macromolecular Chemistry, University of Hamburg, Hamburg, Germany.
F. A. Buzeto, et al, Recycling of Polyolefins by Pyrolysis in a Fluidized Bed Reactor, Department of Polymer Technology, College of Chemical Engineering.
G. Lopez, et al, Recycling poly-(methyl methacrylate) by Pyrolysis in a Conical Spouted Bed Reactor, Chemical Engineering and Processing: Process Intensification, 2010, 1089-1094, vol. 49, University of the Basque Country, Department of Chemical Engineering, Bilbao, Spain.
W. J. Hall, et al, Removal of Organobromine Compounds from the Pyrolysis Oils of Flame Retarded Plastics Using Zeolite Catalysts, Journal of Analytical and Applied Pyrolysis, 2008, 139-147, vol. 81, Energy and Resources Institute, University of Leeds, Leeds, United Kingdom.
W. Kaminsky, et al, Thermal Degradation of Mixed Plastic Waste to Aromatics and Gas, Polymer Degradation and Stability, 1996, 189-197, vol. 53, University of Hamburg, Institute for Technical and Macromolecular Chemistry, Hamburg, Germany.
W. Kaminsky, et al, Thermal Recycling of Polymers, Journal of Analytical and Applied Pyrolysis, 1985, 439-448, vol. 8, Hamburg, Germany.
Jose M. Arandes, et al, Thermal Recycling of Polystyrene and Polystyrene-Butadiene Dissolved in a Light Cycle Oil, Journal of Analytical and Applied Pyrolysis, 2003, 747-760, vol. 70, Bilbao, Spain.
P. G. Ward, et al, A Two Step Chemo-biotechnological Conversion of Polystyrene to a Biodegradable Thermoplastic, Environ. Sci. Technol., 2006, 2433-2437, vol. 40, Hamburg Germany.
Grittner N., et al, Fluid bed pyrolysis of anhydride-hardened epoxy resins and polyether-polyurethane by the Hamburg process, Journal of Analytical and Applied Pyrolysis, Jun. 1993, 293-299, vol. 25 (Abstract only).
W. Kaminsky, et al, Fluidized Bed Pyrolysis of Oil Sand and Oil Shale, German Chemical Engineering, 1983, 306-311, vol. 6—Issue 5 (Abstract only).
W. Kaminsky, Pyrolysis of plastic waste and scrap tyres in a fluid bed reactor, Resource Recovery and Conservation, 1980, 205-216, vol. 5—Issue 3 (Abstract only).
W. Kaminsky, et al, Industrial prototypes for the pyrolysis of used tyres and waste plastic materials, Chem. Ingenieur Techn, 1979, 419-429, vol. 51—Issue 5 (Abstract only).
W. Kaminsky, et al, Pyrolysis of Plastics Wastes and Used Tyres in a Fluidised Bed Reactor, Kunstst Ger Plast, 1978, 14-17, vol. 68—Issue 5 (Abstract only).
H. Sinn, et al, Production of Chemical Raw Materials from Plastics Waste and Wastetires by Means of Pyrolysis, Dechema Monogr, 1976, 1616-1638, vol. 80 (Abstract only).

H. Sinn, et al, Processing of synthetic material residues and used tyres to give chemical raw materials, especially by pyrolysis, Angewandte Chemie, 1976, 737-750, vol. 88—Issue 22 (Abstract only).
W. Kaminsky, et al, Recycling of plastics, Conservation and Recycling, 1976, 91-110, vol. 1—Issue 1 (Abstract only).
J.-S. Kim, et al, Recycling of a fraction of municipal plastic wastes depleted in chlorine for a feedstock in a steam cracker, Polymer Recycling, 1997, 55-59, vol. 3—Issue 1 (Abstract only).
T. Bhasker, et al, Effect of polyethylene terephthalate (PET) on the pyrolysis of brominated flame retardant-containing high-impact polystyrene (HIPS-Br), Journal of Material Cycles and Waste Management, Nov. 2010, 332-340, vol. 12—Issue 4 (Abstract only).
N. Miskolczi, et al, Thermogravimetric analysis and pyrolysis kinetic study of Malaysian refuse derived fuels, Journal of the Energy Institute, 2010, 125-132, vol. 83—Issue 3 (Abstract only).
I.F. Elbaba, et al, Quantification of polybrominated diphenyl ethers in oil produced by pyrolysis of flame retarded plastic, Journal of the Energy Institute, 2008, 158-163, vol. 81—Issue 3 (Abstract only).
W.J. Hall, et al, Pyrolysis of waste electrical and electronic equipment: Effect of antinomy trioxide on the pyrolysis of styrenic polymers, Environmental Technology, 2007, 1045-1054, vol. 28—Issue 9 (Abstract only).
R. Marsh, et al, Thermal degradation of polyethylene film materials due to successive recycling, Journal of Mechanical Engineering Science, 2006, 1099-1108, vol. 220—Issue 8 (Abstract only).
P.T. Williams, et al, Recovery of value-added products from the pyrolytic recycling of glass-fibre-reinforced composite plastic waste, Journal of the Energy Institute, 2005, 51-61, vol. 78—Issues 2 (Abstract only).
A.M. Cunliffe, et al, Recycling of composite plastics in construction and demolition waste by pyrolysis, Proceedings of the International Conference on Sustainable Waste Management and Recycling: Construction Demolition Waste, 2004, 341-348 (Abstract only).
A.M. Cunliffe, et al, Pyrolysis of flame retardant brominated polyester composites, Environmental Technology, 2004, 1349-1356, vol. 25—Issue 12 (Abstract only).
Paul T. Williams, et al, Hydrocarbon gases and oils from the recycling of polystyrene waste by catalytic pyrolysis, International Journal of Energy Research, 2004, 31-44, vol. 28—Issue 1 (Abstract only).
Paul T. Williams, et al, Recovery of fibres, fuels and chemicals from the pyrolysis of fibre reinforced composite plastic waste, Proceedings of the International Symposium, 2003, 127-136, Recycling and Reuse of Waste Materials (Abstract only).
Paul T. Williams, Recycling tricky materials using pyrolysis, Materials World, 2003, 24-36, vol. 11 Issue 7 (Abstract only).
R. Bagri, et al, Fluidised-bed catalytic pyrolysis of polystyrene, Journal of the Institute of Energy, 2002, 117-123, vol. 75 (Abstract only).
R. Bagri, et al, Composition of products from the catalytic pyrolysis of plastics, Proceedings of the TMS Fall Extraction and Processing Conference, 1999, 357-366, vol. 1 (Abstract only).
Paul T. Williams, et al, Product composition from the fast pyrolysis of polystyrene, Environmental Technology, 1999, 1109-1118, vol. 20 Issue 11 (Abstract only).
Paul T. Williams, et al, Recycling plastic waste by pyrolysis, Journal of the Institute of Energy, 1998, 81-93, vol. 71 (Abstract only).
E. A. Williams, et al, The pyrolysis of individual plastics and a plastic mixture in a fixed bed reactor, Journal of Chemical Technology and Biotechnology, 1997, 9-20, vol. 70 Issue 1 (Abstract only).
Paul T. Williams, et al, Polycyclic aromatic hydrocarbons in polystyrene derived pyrolysis oil, Journal of Analytical and Applied Pyrolysis, 1993, 325-334, vol. 25 C (Abstract only).
Paul T. Williams, et al, Pyrolysis of municipal solid waste, Journal of the Institute of Energy, 1992, 192-200, vol. 65 (Abstract only).
Y.H. Lin, et al, Catalytic degradation of high density polyethylene over mesoporous and microporous catalysts in a fluidised-bed reactor, Polymer Degradation and Stability, 2004, 121-128, vol. 86, Department of Chemical Engineering, Kao Yung Institute of Technology, Taiwan, Republic of China.

(56) References Cited

OTHER PUBLICATIONS

Y.H. Lin, et al, Deactivation of US—Y zeolite by coke formation during the catalytic pyrolysis of high density polyethylene, Thermochimica Acta, 1997, 45-50, vol. 294, Environmental Technology Centre, Department of Chemical Engineering, Manchester, UK.

Y. H. Lin, et al, Catalytic pyrolysis of polyolefin waste into valuable hydrocarbons over reused catalyst from refinery FCC units, applied Catalysis A: General, 2007,132-139, vol. 328, Department of Chemical and Biochemical Engineering, Kao Yuan University, Kaohsiung, Taiwan, ROC.

Hung-Ta Lin, et al, Hydrocarbons fuels produced by catalytic pyrolysis of hospital plastic wastes in a fluidizing cracking process, Fuel Process Technology, 2010, Department of Dentistry, Cathay General Hospital, Taipei, Taiwan.

Y. H. Lin, et al, Production of valuable hydrocarbons by catalytic degradation of a mixture of post-consumer plastic waste in a fluidized-bed reactor, Polymer Degradation and Stability, 2009, 1924-1931, vol. 94 Department of Chemical and Biochemical Engineering, Kaohsiung, Taiwan, ROC.

Y. H. Lin, et al, Tertiary Recycling of Commingled Polymer Waste Over Commercial FCC Equilibrium Catalysts for Producing Hydrocarbons, Polymer Degradation and Stability, 2009, 25-33, vol. 94, Department of Chemical and Biochemical Engineering, Kao Yuan University, Kaohsiung, Taiwan, ROC.

Y. H. Lin, et al, Acid-Catalyzed Conversion of Chlorinated Plastic Waste Into Valuable Hydrocarbons Over Post-Use Commercial FCC Catalysts, Journal of Analytical and Applied Pyrolysis, 2010, 154-162, vol. 87, Deparment of Chemical and Biochemical Engineering, Kao Yuan University, Kaohsiung, Taiwan, TOC.

Y. H. Lin, et al, A Combined Kinetic and Mechanistic Modelling of the Catalytic Degradation of Polymers, Journal of Molecular Catalysis, 2001, 143-151, vol. 171, R&D Department, Kaohsiung Chemistry, Taiwan, Republic of China.

T. T. Wei, et al, Chemical Recycling of Post-Consumer Polymer Waste Over Fluidizing Cracking Catalysts for Producing Chemical and Hydrocarbon Fuels, Resources, Conservation and Recycling, 2010, 952-961, vol. 54, Department of Chemical and Biochemical Engineering, Kao Yuan University, Kaohsiung, Taiwan, ROC.

Y. H. Lin, et al, Tertiary Recycling of Polyethylene Waste by Fluidised-bed Reactions in the Presence of Various Cracking Catalysts, Journal of Analytical and Applied Pyrolysis, 2008, 101-109, vol. 83, Department of Chemical and Biochemical Engineering, Kao Yuan University, Taiwan, Republic of China.

I.F. Elbaba, et al, Catalytic Pyrolysis-Gasification of Waste Tire and Tire Elastomers for Hydrogen Production, Energy Fuels, 2010, 3928-3935, vol. 24.

G. Elordi, et al, Product Distribution Modelling in the Thermal Pyrolysis of High Density Polyethylene, Journal of Hazardous Materials, 2007, 708-714, vol. 144.

G. Elordi, et al, Role of Pore Structure in the Deactivation of Zeolites by Coke in the Pyrolysis of Polyethylene in a Conical Spouted Bed Reactor, Applied Catalysts B: Environmental, 2011, 224-231, vol. 102.

E. A. Williams, et al, Analysis of Products Derived From the Fast Pyrolysis of Plastic Waste, Journal of Analytical and Applied Pyrolysis, 1997, 347-363, vol. 40-41.

W. J. Hall, et al, Analysis of Products from the Pyrolysis of Plastics Recovered from the Commercial Scale Recycling of Waste Electrical and Electronic Equipment, Journal of Analytical and Applied Pyrolysis, 2007, 375-386, vol. 79.

P.T. Williams, et al, Analysis of Products from the Pyrolysis and Liquefaction of Single Plastics and Waste Plastic Mixtures, Conservation and Recycling, 2007, 754-769, vol. 51, Resources.

C. Wu, et al, A Novel Ni—Mg—Al—CaO Catalyst with the Dual Functions of Catalysis and CO2 Sorption for H2 Production from the Pyrolysis-Gasification of Polypropylene, Fuel, 2010, 1435-1441, vol. 89.

C. Wu,, et al, Ni/CeO2/ZSM-5 Catalysts for the Production of Hydrogen from the Pyrolysis-Gasification of Polypropylene, International Journal of Hydrogen Energy, 2009, 6242-6252, vol. 34.

A.M. Cunliffe, et al, Characterisation of Products from the Recycling of Glass Fibre Reinforced Polyester Waste by Pyrolysis, Fuel, 2003, 2223-2230, vol. 82.

W. Kaminsky, Chemical Recycling of Mixed Plastics by Pyrolysis, Advances in Polymer Technology, 1995, 337-344, vol. 14 No. 4.

J.A. Onwudili, et al, Composition of Products from the Pyrolysis of Polyethylene and Polystyrene in a Closed Batch Reactor: Effects of Temperature and Residence Time, Journal of Analytical and Applied Pyrolysis, 2009, 293-303, vol. 86.

N.M.M. Mitan, et al, Effect of Decabromodiphenyl Ether and Antimony Trioxide on Controlled Pyrolysis of High-Impact Polystyrene Mixed with Polyolefins, Chemosphere, 2008, 1073-1079, vol. 72.

T. Bhaskar, et al, Controlled Pyrolysis of Polyethylene/Polypropylene/Polystyrene Mixed Plastics with High Impact Polystyrene Containing Flame Retardant: Effect of Decabromo Diphenylethane (DDE), Polymer Degradation and Stability, 2007, 211-221, vol. 92.

International Preliminary Report on Patentability (IPRP) under Chapter I in counterpart International Application No. PCT/IB2013/060828, dated Aug. 18, 2015, pp. 1-6, received from the International Bureau of WIPO.

Lee, Kyong-Hwan, et al., Thermal and Catalytic Degradation of Waste High-Density Polyethylene (HDPE) Using Spent FCC Catalyst, Korean Journal of Chemical Engineering, 2003, 20(4), pp. 693-697.

Weitkamp, Jens, Zeolites and Catalysis, Solid State Ionics, 2000, vol. 131, pp. 175-188.

Manos, George, et al., Catalytic Degradation of High Density Polyethylene on an Ultrastable Y Zeolite, Nature of Initial Polymer Reactions, Patter of Formation of Gas and Liquid Products, and Temperature Effects., Ind. Eng. Chem. Res., 2000, 39, 1203-1208.

S.A. Rovenskaja et al., Aromatization of Light Naptha Fractions on Zeolites 1. Kinetic Model, Chem. Ind., 2003, pp. 399-404, 57 (9).

T. M. Mateeva et al., Kinetics of the Hydrogenation of C6-C9 Olefins in the Presence of Aromatic Hydrocarbons on Palladium Sulfate Catalyst, N.D. Zelinskii Institute of Organic Chemistry, Academy of Sciences of the USSR, 1985, pp. 2437-2442, No. 11.

A. Corma et al., Hydrogenation of Aromatics in Diesel Fuels on Pt/MCM-41 Catalysts, Journal of Catalysis, 1997, pp. 480-489, 169.

First Examination Report received in counterpart European Patent Application No. EP20130848134.6 dated Jun. 23, 2016, pp. 1-4.

Office Action received in counterpart Chinese Patent Application No. CN2013875575 dated May 18, 2016, pp. 1-6.

* cited by examiner

CONVERSION OF PLASTICS TO OLEFIN AND AROMATIC PRODUCTS USING TEMPERATURE CONTROL

TECHNICAL FIELD

The invention relates to the conversion of plastics and other hydrocarbons to olefin and aromatics through pyrolysis.

BACKGROUND

Waste plastics are mostly diverted to landfills or are incinerated, with a smaller fraction being diverted to recycling. Over the years, with increased regulations and levies on landfills, the percentage of the post-consumer waste being recycled or incinerated for energy recovery is gradually increasing. The 2009 statistics by Plastics Europe indicate that approximately 24.4 million tons of waste plastics were generated in Europe. Of this, 54% was treated either through recycling (22.6%) or energy recovery (31.3%). Plastics diverted to landfills were approximately 46.1%. Thus, waste plastics disposal into landfills is becoming increasingly difficult.

Pyrolysis of waste plastics to products like naphtha, ethylene, propylene and aromatics can be classified under the category of feedstock recycling of waste plastics. With the naphtha prices increasing dramatically, steam crackers operating on naphtha feed are at a disadvantageous position compared to steam crackers operating on cheaper gaseous hydrocarbon feeds. If a portion of the naphtha feed to the steam crackers is replaced by an equivalent amount of products from plastics conversion processes, like pyrolysis, the economic situation for the steam crackers operating on naphtha feed will improve.

In order to make an impact on the economics of very large volumes in continuous steam cracker plant operations, it is necessary that the pyrolysis process is also continuous. No large scale plants exist today that directly convert waste plastics in a single step to petrochemicals. Previous attempts around the world have been focused on generation of liquid fuels from waste plastics. These plants were small in scale or modular in nature. Reactions carried out in such small scale plants are also carried out for longer residence times, making them less suitable for continuous operations on larger scales. Some earlier attempts have also focused at generating feedstocks for steam crackers from waste plastics. These rely on the availability of steam cracker furnaces for being successful, however. Furthermore, conversion of these produced steam cracker feeds in cracker furnaces would typically result in production of high amounts of methane, which is undesirable.

What is therefore needed is a process for the conversion of plastics directly to petrochemical products, such as olefins and aromatics, that minimize formation of methane, and that maximizes the yield of olefins and aromatics.

SUMMARY

A method of producing olefins and aromatic compounds from a feedstock, the method is carried out by introducing a hydrocarbon feedstock and a catalyst composition that is suitable for converting the feedstock to at least one of olefins and aromatic compounds within a reactor wherein the reactor has at least one inlet for introducing the feedstock and the catalyst composition and having at least one outlet for removing reaction products from the reactor that is spaced from the at least one inlet along a reactor flow path having a length L between the at least one inlet and at least one outlet. The temperature in the reactor is monitored at at least one location that is at or adjacent to said at least one inlet at a temperature-monitoring distance that is from 0.3 L or less from the at least one inlet. In response to one or more monitored temperatures from said at least one location, one or more parameters are modified. At least a portion of the feedstock is allowed to be converted to at least one of olefins and aromatic compounds within the reactor. A product stream containing said at least one of olefins and aromatic compounds is removed from the at least one outlet of the reactor.

In particular embodiments, the one or more parameters may include modifying one or more of the following (a) through (d), wherein a) is the catalyst composition introduced into the at least one inlet; b) is the flow rate of the catalyst composition into the at least one inlet; c) is the flow rate of feedstock into the at least one inlet; and d) is heat input to the reactor.

In some applications, monitoring the temperature may include monitoring the temperature in the reactor at at least two locations that are at or adjacent to said at least one inlet at a temperature-monitoring distance that is from 0.3 L or less from the at least one inlet, with the at least two locations being spaced apart at least one of longitudinally or laterally from each other within the reactor. In certain instances, the at least two locations are spaced apart longitudinally and in other instances the at least two locations are spaced apart laterally.

In certain embodiments, monitoring the temperature may include monitoring the temperature in the reactor at at least three locations that are at or adjacent to said at least one inlet at a temperature-monitoring distance that is from 0.3 L or less from the at least one inlet, the at least three locations being spaced apart at least one of longitudinally or laterally from each other within the reactor.

The monitoring of the temperature may include monitoring the temperature at at least one other location that is at a temperature-monitoring distance that is greater than 0.3 L from the at least one inlet.

In further variations, the temperature-monitoring distance may be from 0.2 L or less from the at least one inlet. In other variations, the temperature-monitoring distance may be from 0.1 L or less from the at least one inlet.

In certain instances, the feedstock and catalyst composition may be introduced into the at least one inlet as separate feeds. In other instances, the feedstock and catalyst composition are introduced into the at least one inlet as a mixture.

In particular applications, the monitored temperatures from the at least one location are weighted and the weighted temperatures are correlated to a desired product yield and used in modifying the one or more parameters.

In some embodiments, the feedstock may comprise at least one of polyolefins, polyethylene, polypropylene, polystyrene, polyethylene terephthalate (PET), polyvinyl chloride (PVC), polyamide, polypolycarbonate, polyurethane, polyester, natural and synthetic rubber, tires, filled polymers, composites, plastic alloys, plastics dissolved in a solvent, biomass, bio oils, and petroleum oils.

In another embodiment of the invention, a method of producing olefins and aromatic compounds from a feedstock is accomplished by introducing a hydrocarbon feedstock and a catalyst composition within a reactor. The catalyst composition is comprised of a fluidized catalytic cracking (FCC) catalyst and a ZSM-5 zeolite catalyst, wherein the amount of ZSM-5 zeolite catalyst makes up from 10 wt. % or more by total weight of the FCC catalyst and the ZSM-5 zeolite catalyst. The reactor has at least one inlet for introducing the feedstock and the catalyst composition and has at least one outlet for removing reaction products from the reactor that is spaced from the at least one inlet along a reactor flow path having a length L between the at least one inlet and at least one outlet. The temperature in the reactor is monitored at at least one location that is adjacent to said at least one inlet at a temperature-monitoring distance that is from 0.3 L or less from the at least one inlet. In response to one or more monitored temperatures from said at least one location, one or more of the following (a) through (d) are modified, wherein a) is the catalyst composition introduced into the at least one inlet; b) is the flow rate of the catalyst composition into the at least one inlet; c) is the flow rate of feedstock into the at least one inlet; and d) is heat input to the reactor. At least a portion of the feedstock is allowed to be converted to at least one of olefins and aromatic compounds within the reactor. A product stream containing said at least one of olefins and aromatic compounds is removed from the at least one outlet of the reactor.

In certain applications, monitoring the temperature includes monitoring the temperature in the reactor at at least two locations that are at or adjacent to said at least one inlet at a temperature-monitoring distance that is from 0.3 L or less from the at least one inlet, the at least two locations being spaced apart at least one of longitudinally or laterally from each other within the reactor.

In some embodiments, one or more of (a) through (d) are modified to maintain the weighted average temperature of the at least two locations of at least 550° C. In others, one or more of (a) through (d) are modified to maintain the weighted average temperature of the at least two locations of from 570° C. to 680° C.

In some variations, the at least two locations are spaced apart longitudinally. In other variations, the at least two locations are spaced apart laterally.

Monitoring the temperature may also include monitoring the temperature in the reactor at at least three locations that are at or adjacent to said at least one inlet at a temperature-monitoring distance that is from 0.3 L or less from the at least one inlet, the at least three locations being spaced apart at least one of longitudinally or laterally from each other within the reactor in some applications.

In further variants, monitoring the temperature may include monitoring the temperature at at least one other location that is at a temperature-monitoring distance that is greater than 0.3 L from the at least one inlet. In others, the temperature-monitoring distance may be from 0.2 L or less from the at least one inlet. In still others, the temperature-monitoring distance is from 0.1 L or less from the at least one inlet.

In certain instances, the feedstock and catalyst composition may be introduced into the at least one inlet as separate feeds. In other instances, the feedstock and catalyst composition are introduced into the at least one inlet as a mixture.

In some embodiments, the amount of ZSM-5 zeolite catalyst of the catalyst composition may makes up from 30 wt. % to 45 wt. % of the total weight of the FCC catalyst and the ZSM-5 zeolite catalyst.

In particular applications, the monitored temperatures from the at least one location are weighted and the weighted temperatures are correlated to a desired product yield and used in modifying the one or more parameters.

In some embodiments, the feedstock may comprise at least one of polyolefins, polyethylene, polypropylene, polystyrene, polyethylene terephthalate (PET), polyvinyl chloride (PVC), polyamide, polypolycarbonate, polyurethane, polyester, natural and synthetic rubber, tires, filled polymers, composites, plastic alloys, plastics dissolved in a solvent, biomass, bio oils, and petroleum oils.

BRIEF DESCRIPTION OF THE DRAWINGS

For a more complete understanding of the present invention, reference is now made to the following descriptions taken in conjunction with the accompanying figures, in which.

DETAILED DESCRIPTION

Figure 1:
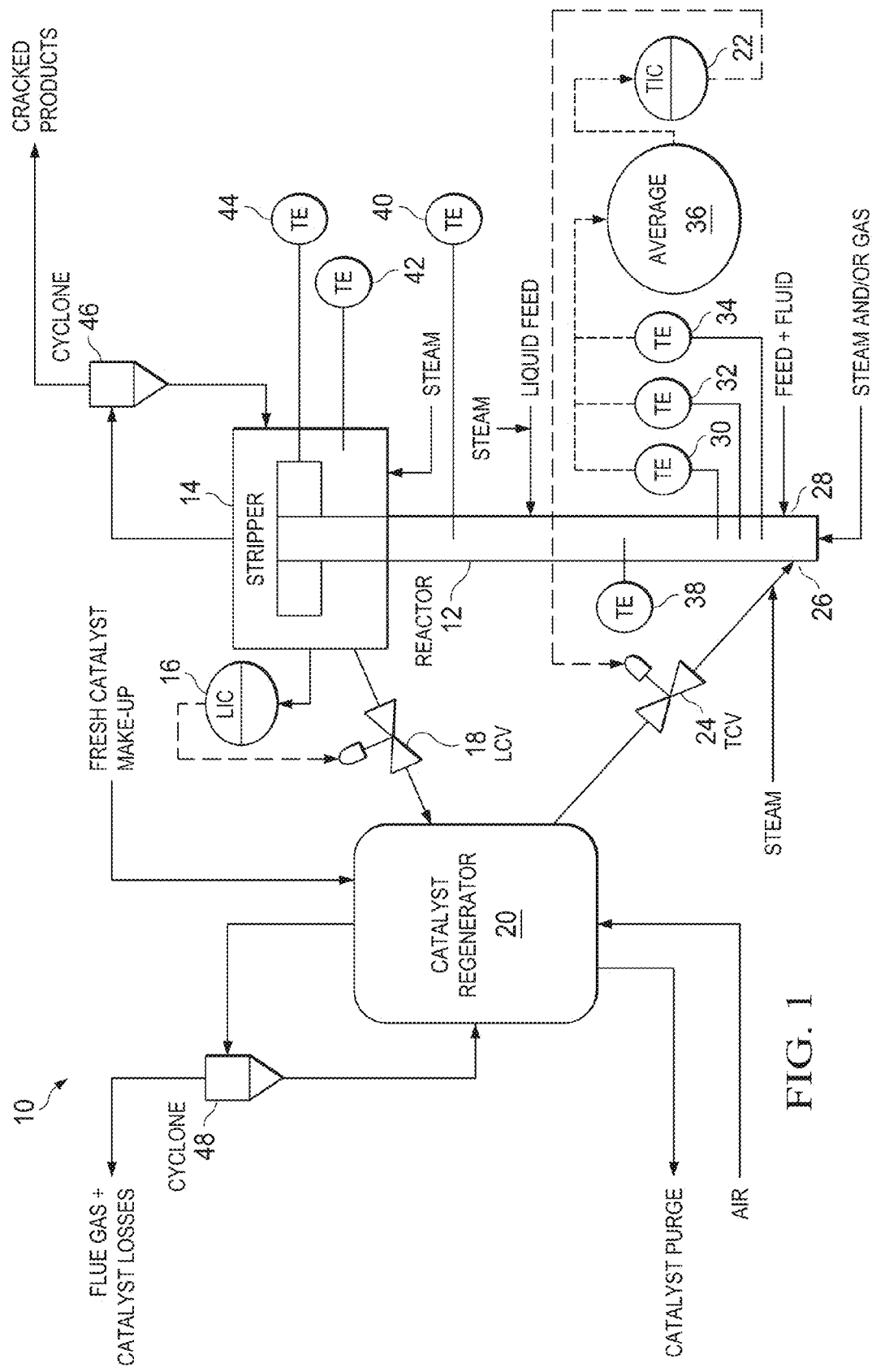
FIG. 1 is a schematic for a control system of a catalytic plastics pyrolysis unit reactor using weighted average longitudinal and lateral temperatures monitored at a short temperature-monitoring distance near the reactor bottom.

In the present invention, plastics and other hydrocarbons are converted through pyrolysis to monomers with high yields of light gas olefins (e.g., ethylene, propylene and butenes) and aromatics, with low yields of methane. The conversion can be accomplished with a low residence time (on the order of seconds) making it ideally suited for large scale commercial operations.

The process utilizes a catalyst composition that is suitable for converting the plastic or hydrocarbon feedstock to at least one of olefins and aromatic compounds through pyrolysis. These may include conventional catalysts used for such processes. Non-limiting examples of conventional catalyst compositions are those described in U.S. Pat. Nos. 4,664,780; 4,970,183; 5,173,463; 5,348,643; 6,613,710; and 6,696,378, each of which is incorporated herein by reference in its entirety. These may include FCC catalysts, resid FCC catalysts, alumina/silica catalysts, mesoporous materials and various zeolites.

In other embodiments, the catalyst composition may include a novel catalyst system that is described in copending U.S. application Ser. No. 13/764,886, filed Feb. 12, 2013, and published as U.S. Pat. App. Pub. No. US2014/0228204, which is hereby incorporated herein by reference in its entirety for all purposes. The catalyst composition described therein is comprised of a fluid catalytic cracking (FCC) catalysts and a ZSM-5 zeolite catalyst additive that are used in combination with one another in a catalyst composition to facilitate the pyrolytic conversion of the plastic or hydrocarbon feed.

The FCC catalysts are those useful in the cracking of petroleum feeds. Such petroleum feeds may include vacuum gas oil (350-550° C. boiling range), atmospheric gas oil and diesel (220-370° C. boiling range), naphtha (<35° C. to 220° C. boiling range) or residues (boiling at >550° C. range) from a crude oil atmospheric and vacuum distillation units or the various such streams generated from all secondary processes in refineries including hydrotreating, hydrocracking, coking, visbreaking, solvent deasphalting, fluid catalytic cracking, naphtha reforming and such or their variants. The FCC catalysts are typically composed of large pore molecular sieves or zeolites. Large pore zeolites are those having an average pore size of from 7 Å or more, more typically from 7 Å to about 10 Å. Suitable large pore zeolites for FCC catalysts may include X-type and Y-type zeolites, mordenite and faujasite, nano-crystalline Zeolites, MCM mesoporous materials (MCM-41, MCM-48, MCM-50 and other mesoporous materials), SBA-15 and silico-alumino phosphates, gallophosphates, titanophosphates. Particularly useful are Y-type zeolites.

In Y-type zeolites used for FCC catalysts, the silica and alumina tetrahedral are connected by oxygen linkages. In order to impart thermal and hydrothermal stability, the Y-zeolite may be subjected to treatment to knock off some framework alumina (one of these routes is steaming at high temperature). Typically Y-zeolites have Si/Al ratio of about 2.5:1. The dealuminated Y-zeolite typically has a Si/Al ratio of 4:1 or more. The dealuminated Y-zeolite, with a higher framework Si/Al ratio, has stronger acid sites (isolated acid sites) and is thermally and hydrothermally more stable and is thus called ultrastable Y-zeolite (USY-zeolite). In units like fluid catalytic cracking where the catalysts see temperatures of 700° C. and also moisture in a catalyst regenerator, the thermal and hydrothermal stability is important so that catalyst activity is maintained over a longer period of time. Hence, in such types of operation USY-zeolite may be the preferred FCC catalyst.

The ultrastable zeolites may also be rare-earth-exchanged. The rare-earth content may be higher than 0% and may be as high as 10% by weight of the zeolite, with from 0.1-3% by weight of zeolite being typical. The higher the rare earth content, however, the more olefinicity of the products is lost by favoring hydrogen transfer reactions to make paraffins. Some amount of rare earth in the zeolite Y may be useful because it imparts stability to the zeolite. The rare earth materials may include cerium, lanthanum and other rare earth materials.

It should be understood that with respect to any concentration or amount range listed or described in the summary and detailed description as being useful, suitable, or the like, it is intended to include every concentration or amount within the range, including the end points, and is to be considered as having been specifically stated. For example, "a range of from 1 to 10" is to be read as indicating each and every possible number along the continuum between about 1 and about 10. Thus, even if specific data points within the range, or even no data points within the range, are explicitly identified or refer to only a specific few, it is to be understood that the inventors appreciate and understand that any and all data points within the range are to be considered to have been specified, and that the inventors are in possession of the entire range and all points within the range.

The FCC catalysts are typically the afore-mentioned zeolites embedded in an active matrix. The matrix may be formed from an active material, such as an active alumina material that could be amorphous or crystalline, a binder material, such as alumina or silica, and an inert filler, such as kaolin. The zeolite component embedded in the matrix of the FCC catalyst may make up from 10 to 90% by weight of the FCC catalyst. The FCC catalyst with the zeolite material embedded within the active matrix material may be formed by spray drying into microspheres. These catalysts are hard and have very good attrition resistance to withstand the particle-particle and particle-wall collisions that usually occur when the catalysts are fluidized. The particle size distribution for the FCC catalyst may range from greater than 0 to 150 microns. In certain embodiments, 90-95% of the particle size distribution may be within the range of from greater than 0 to 110 microns or 120 microns, with from 5-10% of the particles having particle sizes of greater than 110 microns. As a result of the distribution of particle sizes, the average or median particle size for the FCC catalyst is typically 70 to 75 microns. In certain instances, finer particles of the FCC catalyst may be used with larger particles to provide good fluidization. In certain embodiments, for example, 15% or less of the FCC catalyst may have a particle size of 40 microns or less. Good fluidization is imparted by presence of fines in a mix of fine and coarse particles. Loss of fine particles leads to de-fluidization.

The FCC catalysts may be further characterized based on certain physical, chemical, surface properties and catalytic activity. Fresh FCC catalysts have a very high surface area typically 300-400 $m^2/g$ or higher and a high activity. As a result of the high activity of the fresh FCC catalyst, cracking of petroleum feeds with the fresh FCC catalyst usually results in high yields of coke, such as 8-10 wt. %, and light gas. The very high yields of coke can affect the heat balance of the reaction as all the heat generated by coke formation may not be needed for cracking. Heat removal from a reactor-regenerator system thus may be necessary. This means that the feed is not effectively utilized. It would be more economically valuable if just enough coke required for supporting the cracking process heat requirements was made, with the balance that otherwise goes into excess coke formation being used to form useful products. Also, high yields of light gases (methane, ethane) from the fresh FCC catalyst are undesirable and may exceed the plant wet gas compressor equipment constraints or limits in an FCC complex. High yields of methane are undesirable because of its limited utility in forming chemicals (even though it is possible to form higher hydrocarbons from methane through syngas-methanol-olefins route). Ethane on the other hand may be used for making ethylene, a valuable chemical. In most cases, however, higher ethane yield is accompanied by a higher methane yield.

In order to overcome these problems, the FCC cracking unit is typically operated by maintaining a constant activity or conversion. This is done by having a circulating inventory of partially deactivated catalyst and then periodically purging a small portion of the used or non-fresh catalyst and making that up with fresh FCC catalyst. The use of used or non-fresh catalyst helps in maintaining the catalyst activity at a constant level without producing high levels of methane and coke. The circulating inventory of plant catalyst is partially deactivated or equilibrated under plant operating conditions. The portion of this catalyst that is purged out periodically is the spent catalyst. Thus in terms of catalyst activity it generally has the same activity of the circulating catalyst inventory in the FCC unit before make-up fresh catalyst is added. This catalyst make-up and purging is typically done on a regular basis in an operating FCC unit. The circulating catalyst inventory has roughly 50% or less of the surface area of the fresh catalyst and activity or conversion that is roughly 10 conversion units lower than that of fresh catalyst. In other words, if fresh catalyst were to provide a conversion of 80 wt. % of vacuum gas oil range material to dry gas ($H_2$—$C_2$), LPG ($C_3$-$C_4$), gasoline (35-220° C. boiling hydrocarbons) and coke, then the circulating partially deactivated catalyst inventory could provide a conversion of 70 wt. %. The FCC fresh catalyst particles added through make-up to the circulating unit would on an average spend several days (age) in the unit before it is purged out. Thus, due to the fact that daily make-up is made to the catalyst inventory, the circulating catalyst inventory would typically have catalyst particles of different ages, i.e., there is an age distribution of catalyst particles in the inventory. The catalyst activity of a particle is proportional to its deactivation in the FCC unit which in turn is also proportional to the age of the catalyst. The following Table 1 below lists typical properties between fresh and spent FCC catalysts.

TABLE 1

| Property | Fresh FCC Catalyst | Spent FCC Catalyst |
| --- | --- | --- |
| Total surface area, $m^2/g$ | 320-360 | 130-170 |
| Unit cell size, angstroms | 24.4-24.7 | 24.2-24.4 |
| Conversion of standard petroleum feed or activity, wt % | 78-85 | 67-73 |
| Ni + V, ppm | 0 | Typically 500-3000 |
| Coke on the catalyst, wt % | 0 | 0-0.5 typically |
| Sulfur oxide (Sox) reduction and/or Sulfur reduction additives present? | No | Yes* |

*Sox and S reduction additives are usually from 10-15 wt. %. Sox and S reduction additives would not have catalyst activity for cracking and thus would dilute the catalyst activity. These additives are usually added to meet automotive fuel specification requirements for streams generated from the FCC unit and for mitigating Sox liberation to environment. Usually oxides of magnesium are used in such additives and they would be having lower or no conversion for breaking molecules and would thus reduce the ability of the FCC catalyst to convert heavier molecules to lighter molecules i.e. activity dilution.

In embodiments of the present invention that make use of a catalyst composition that comprises an FCC catalyst and a ZSM-5 zeolite catalyst, the composition can be made up of either fresh FCC catalyst, non-fresh FCC catalyst, or a mixture of both. This may include spent FCC catalyst that is removed from the fluidized catalytic cracking process, as described previously. Because spent FCC catalyst is typically a waste product from the fluidized catalytic cracking process, its use in the conversion of plastics to useful products is particularly advantageous. This is due to both its lower cost and availability and due to its favorable activity in not forming more coke and methane. The spent FCC catalyst is essentially "used" or "non-fresh" FCC catalyst that has been used in the fluidized catalytic cracking process and has been removed for replacement with fresh catalyst, as previously described. As used herein, the expression "non-fresh" with respect to the FCC catalyst is meant to encompass any FCC catalyst, as they have been described, that has some amount (i.e. greater than 0%) of coke deposition. Fresh FCC catalyst would have no coke deposits. In some embodiments, the coke deposition on the non-fresh FCC catalyst may be from 0.01%, 0.05%, 0.1%, 0.2%, 0.3%, 0.4% or more by weight of the catalyst. Typically, the coke deposition for the non-fresh FCC catalyst will range from greater than 0 to 0.5% by weight of the catalyst. The spent FCC catalyst may have non-fresh catalyst particles with differing degrees of catalyst coking due to differences in the catalyst ages of use in the cracking process. The non-fresh FCC catalyst also has a reduced surface area compared to fresh FCC catalyst due to catalyst hydrothermal deactivation in the FCC unit. Typical surface area for the non-fresh catalyst may range from 100 $m^2/g$ to 200 $m^2/g$. Additionally, in some embodiments the FCC catalyst may include a combination of non-fresh or spent FCC catalyst and fresh FCC catalyst and may be used in the pyrolysis conversion reaction.

The ZSM-5 zeolite catalyst additive used in combination with the FCC catalyst is a molecular sieve that is a porous material containing intersecting two-dimensional pore structure with 10-membered oxygen rings. Zeolite materials with such 10-membered oxygen ring pore structures are often classified as medium-pore zeolites. Such medium-pore zeolites typically have pore diameters ranging from 5.0 Å to 7.0 Å. The ZSM-5 zeolite is a medium pore-size zeolite with a pore diameter of from about 5.1 to about 5.6 Å. The ZSM-5 zeolite and their preparation are described in U.S. Pat. No. 3,702,886, which is herein incorporated by reference. The ZSM-5 zeolite may be free from any metal loading.

The ZSM-5 zeolite is also typically embedded in an active matrix, which may be the same or similar to those used for the zeolite of the FCC catalyst, as previously described. The matrix may be formed from an active material, such as an active alumina material, a binder material, such as alumina or silica, and an inert filler, such as kaolin.

The zeolite component embedded in the matrix of the ZSM-5 catalyst may make up from 5 to 90% by weight of the ZSM-5 zeolite catalyst and more typically between 10-80% by weight of the ZSM-5 zeolite catalyst, and still more typically between 10 to 50% by weight of the ZSM-5 zeolite catalyst. The ZSM-5 zeolite catalyst with the ZSM-5 zeolite material embedded within the active matrix material may also be formed by spray drying into microspheres. The particle size distribution for the ZSM-5 zeolite catalyst may range from greater than 0 to 150 microns. In certain embodiments, 90-95% of the particle size distribution may be within the range of from greater than 0 to 110 microns or 120 microns. The average or median particle size for the ZSM-5 zeolite catalyst is typically 70 to 75 microns. In certain instances, finer particles of the ZSM-5 zeolite catalyst may be used with larger particles to provide good fluidization. In certain embodiments, for example, 15% or less of the ZSM-5 zeolite catalyst may have a particle size of 40 microns or less.

In certain embodiments, the zeolite material (e.g. X-type zeolite or Y-type zeolite) of the FCC catalyst and the ZSM-5 zeolite may be embedded and formed within the same matrix material unit so that catalyst particles containing both the FCC catalyst and ZSM-5 catalyst materials are formed. These particles may be of the same size and configuration as those previously described for the separate FCC catalyst and ZSM-5 zeolite catalyst. One of the advantages of combining the FCC and ZSM-5 zeolite component in a single matrix or particle is that it may result in a higher activity that can be obtained by minimizing the in-active diluents in the individual catalysts.

The catalysts selected for use in the plastic pyrolysis may have similar properties to FCC catalysts in terms of particle size distribution and attrition resistance, as these parameters may greatly influence the integrity of the catalyst recipe in an operating fluidized bed environment. Very fine particles can lead to their high losses due to their being entrained with product gases, while bigger catalyst particle sizes tend to not fluidize properly and result in non-uniform activity. In certain embodiments, however, pure forms of the FCC catalyst and the ZSM-5 zeolite without any matrix material or smaller particle sizes may be employed in systems where there is less probability of the catalyst being lost, such as in rotary kilns and slurry reactors.

In the present invention, plastic pyrolysis using the catalyst system produces valuable monomers of light gas olefins and aromatics, such as benzene, toluene and xylenes. The process yields are tunable to the desired yields of olefins and aromatics by using a combination of the catalyst system and process operating conditions. It has been found that with a combination of FCC catalysts and ZSM-5 zeolite catalyst additive, as has been described, higher yields of olefins and aromatics can be obtained as compared to using only an FCC catalyst. Specifically, a catalyst system containing from 10 wt. % or more of ZSM-5 zeolite catalyst of the total weight of the FCC catalyst and the ZSM-5 zeolite catalyst provides increased yields of olefins and aromatics. As used herein, weight percentages of the ZSM-5 zeolite catalysts and FCC catalysts are based upon the total weight of the catalyst, including any matrix material, unless expressly stated otherwise. Where no matrix material is employed in the reactions the weight percentages of the ZSM-5 zeolite catalysts and FCC catalysts are the weight percentage of the zeolites only.

In certain embodiments, the amount of ZSM-5 zeolite catalyst of the catalyst composition makes up from 10 wt. % to 50 wt. % of the total weight of the FCC catalyst and the ZSM-5 zeolite catalyst. Thus, the amount of ZSM-5 zeolite catalyst of the catalyst composition makes up from 10 wt. %, 15% wt. %, 20% wt. %, 25% wt. %, 30% wt. %, or 35% wt. % to 40% wt. %, 45% wt. %, or 50 wt. % of the total weight of the FCC catalyst and the ZSM-5 zeolite catalyst. In still other embodiments, the amount of ZSM-5 zeolite catalyst of the catalyst composition makes up from 30 wt. % to 45 wt. % of the total weight of the FCC catalyst and the ZSM-5 zeolite catalyst. In further embodiments, the amount of ZSM-5 zeolite catalyst of the catalyst composition makes up from 35 wt. % to 40 wt. % of the total weight of the FCC catalyst and the ZSM-5 zeolite catalyst. In particular instances, it has been found that the highest yields of olefins and aromatics are produced when the ZSM-5 zeolite catalyst is used in an amount of approximately 37.5 wt. % of the total weight of the FCC catalyst and the ZSM-5 zeolite catalyst.

The plastic feed used in the conversion reaction may include essentially all plastic materials, such as those formed from organic polymers. Non-limiting examples include polyolefins, such as polyethylene, polypropylene, etc., polystyrene, polyethylene terephthalate (PET), polyvinyl chloride (PVC), polyamide, polycarbonate, polyurethane, polyester, natural and synthetic rubber, tires, filled polymers, composites and plastic alloys, plastics dissolved in a solvent, etc. While plastic feeds may be used in the conversion reaction, other hydrocarbon materials may also be used as the feedstock. These hydrocarbons may include biomass, bio oils, petroleum oils, etc. Thus, while the present description is directed primarily to the conversion of plastic feeds, it should be understood that the invention has applicability to and encompasses the use of other hydrocarbons as well. When production of light gas olefins is desired, a plastic feed of polyolefins or that is primarily or contains a substantial portion of polyolefins may be preferred. Mixtures of various different plastic and hydrocarbon materials may be used without limitation.

The plastic feed may be provided in a variety of different forms. In smaller scale operations, the plastic feed may be in the form of a powder. In larger scale operations, the plastic feed may be in the form of pellets, such as those with a particle size of from 1 to 5 mm.

The catalyst and plastic feed may be mixed together prior to introduction into the reactor or may be fed separately. The amount or ratio of catalyst used to plastic feed may vary and may be dependent upon the particular system used and process conditions. Plastics can be converted using a very low or very high catalyst-to-feed (C/F) ratio. Longer contact times may be needed in the case of a low C/F ratio, while shorter contact times may be need for a high C/F ratio. In testing, C/F ratios of from 4 to 12 were used, with C/F ratios of from 6 to 9 being most frequently used. In large scale industrial process wherein a circulating fluidized bed riser or downer may be used, the C/F ratio may be determined by the reactor heat balance or other parameters.

Various reactors may be used for the conversion process. For large scale operations, a circulating fluidized bed riser or downer reactor may be used. A bubbling bed reactor where the catalyst is bubbled in-situ, with the feed being added to the bubbling bed may also be used. Slurry-type reactors and rotating kiln-type reactors may also be used in some applications.

The catalyst composition composed of the FCC catalyst and ZSM-5 zeolite catalyst and the plastic feed are introduced (mixed or added separately) into a reactor, such as a fluidized bed reactor, as previously described. The reactor is operated at a reactor temperature wherein all or a portion of the reactor is at a temperature of 550° C. or higher. In some embodiments, the reactor is operated at a reactor temperature wherein all or a portion of the reactor is at a temperature of 570° C. or higher. In certain embodiments, the reactor is operated at a reactor temperature wherein all or a portion of the reactor is at a temperature of from 550° C. to 730° C., more particularly from 570° C. to 680° C., 690° C. or 700° C. Reactor pressures may range from ambient to 50 bar(g) (5 MPa) and more typically from ambient to 3 bar(g) (0.3 MPa). Nitrogen, dry gas ($H_2$—$C_2$), steam or other inert gases or mixture of gases may be used as a carrier gas in which the catalyst and feed are entrained. A range of fluidization gas flow rates can be employed in different modes, such as bubbling fluidized bed mode, circulating fluidized bed mode, slurry tank reactor mode. Other reactor configurations and modes may also be used. In particular embodiments, a circulating fluidized mode may be used because it offers advantages on coke management, better heat transfer and contacting between feed and catalysts. The catalyst/feed ratio (C/F) can range from as low as 2 and as high as 30 and more typically in the range of 4-12.

The process yields of plastics pyrolysis are tunable to the desired yields of olefins and/or aromatics by using a combination of catalysts and process operating conditions. This may be accomplished by using temperature sensors or thermocouples that measures the reactor temperature at a selected position or positions. These selected positions may be an area at or adjacent to the inlet or inlets where the catalyst composition and/or plastic feed are introduced into a continuous flow reactor or at or adjacent to an area in the catalyst bed having complete or greatest mixing of plastic feed and catalyst composition in a batch reactor. Such locations are where the most temperature changes occur during the process, and this is where most of the conversions take place within the reactor.

The temperature variation in these zones is high as feed and catalyst are charged into the reactor. Most of the temperature changes occur in the first minute following the addition of the catalyst and feed into the reactor in the case of a batch reactor. For a continuous flow reactor, most temperature changes occur at or downstream the inlet or inlets where the catalyst composition and/or plastic feed are introduced into the reactor. In the case of the batch reactor, during this one (1) minute period or within a few meters from the feed and/or catalyst composition inlets in continuous flow reactor, there may be a rapid temperature drop due to the introduction of cold feed and due to the endothermic nature of the cracking.

In the case of a continuous flow reactor operating adiabatically, there is a continuous drop in temperature in the reactor downstream from the inlet point(s). There is a reaction zone, however, where the temperature drop is steep as compared to the rest of the continuous flow reactor. There is also a minimum temperature in this steep temperature-change zone. In the case of an isothermal continuous reactor (externally heated), there is a drop in temperature near the plastic feed and/or catalyst composition inlets and a temperature regain downstream. This reduced temperature resulting from the charging of the feed and catalyst at the start of the reaction may be referred to as the "minimum catalyst bed temperature," the "minimum reactor bed temperature," or similar expressions. In a continuous flow reactor, this minimum temperature is reached within short distance (e.g., within a few meters) downstream of the feed and/or catalyst composition inlets.

In batch-type reactors, the minimum reactor bed temperature is usually reached within 10 to 15 seconds after charging of the feed. In a batch reactor, the reactor is usually preheated to a set temperature before the start of the reaction. When the feed and catalyst are charged, however, there are several things that are taking place at the same time. These include the preheating of the feed to the reactor temperature, the phase change of feed and products from solid to liquid or liquid to gas, the heat of reaction for the cracking reaction (which is endothermic), the heating of the catalyst to the reactor temperature, the latent heat for loss of any water present in the catalyst, etc. All of these changes need to be accounted and accommodated for in the batch reactor and using the furnace that is used to heat the reactor. Even though the reactor is heated with the furnace, which is controlled with a temperature control, there is a finite time before the control action for restoring the pre-set bed temperature takes effect. This therefore contributes to the observed drop in temperature as the feed and catalyst are charged into the batch unit.

A time-interval average catalyst bed temperature may be useful for control purposes in batch reactions and can be correlated to monitored temperatures at located different monitoring positions in continuous flow reactors, as will be described later on. This "time-interval average catalyst bed temperature" may be, for example, a one-minute average bed temperature, 5-minute average bed temperature, 10-minute average bed temperature, etc. The time-interval average bed temperature may be defined by the formula (1) below:

$$T_I = 1/N \times (T_1 + \ldots + T_{N-3} + T_{N-2} + T_{N-1} + T_N) \qquad (1)$$

where $T_I$ is the time-interval average bed temperature over time interval I; and N=the number of temperature measurements made over the selected time interval I. As an example, a one-minute average bed temperature (I=1 min) may have five different temperatures (i.e. N=5) that are measured and recorded at 0 seconds, 10 seconds, 20 seconds, 40 seconds and at 1 minute. It is to be understood that instead of just only an arithmetic average of temperatures recorded at the sampled time, one may also use a weighted average, where different weights are accorded to the different temperatures measured.

Because most of the temperature changes occur in the first minute following the addition of the catalyst and feed in batch reactions, the minimum reactor bed temperature and time-interval average bed temperatures within short time intervals where I is 2 minutes or less may be particular useful in control schemes. The minimum reactor bed temperature and a one-minute average bed temperature, for example, have been shown to track olefin yields, which may in turn be correlated and applied to continuous flow or steady state processes. Time-interval average catalyst bed temperatures in batch reactions measured over longer time intervals may also be useful in certain applications. These may include long time intervals of over 2 minutes, such as 3 minutes, 4 minutes, 5 minutes, 10 minutes, 15 minutes, etc. In many cases, the long time intervals will be between 2 minutes and 15 minutes.

In continuous steady state flow processes, for example in a tubular flow reactor (steady state in a tubular flow reactor means concentrations and conditions vary along the spatial variable and is not variant in time for each position in space), temperatures measured at and immediately downstream of the feed introduction point(s) are similar to and thus may be used to replace short time-interval average reaction bed temperatures in a batch process. This is because time derivative (variations) of bed temperature in an unsteady tubular batch reactor may be treated analogous to spatial derivative (variations) of temperature in a continuous steady state flow reactor. In the case of continuous stirred tank reactors (CSTR), at all points inside the reactor, temperature and composition are the same as long as flow into the reactor or the reaction extent is the same. Hence in the case of CSTR, average temperature would mean temperature measured in the reactor.

Temperatures measured at and immediately downstream of the feed introduction point(s) in a continuous flow reactor can then be used in control schemes to control variables that may affect the reaction and thus the products formed. These variables may include a) the catalyst composition introduced into the reactor; b) the flow rate of the catalyst composition into the reactor; c) the flow rate of plastic feedstock into the reactor; and/or d) heat input used to heat the reactor, particularly where an isothermal or a preferred heating profile operation is desired. For example, the flow of a regenerated hot catalyst from a regenerator can be varied to attain a desired reactor temperature and as a result it varies the catalyst severity. In response to the monitored temperatures, these variables can be controlled to optimize olefin yields as well as minimize the formation of undesirable products, such as liquid product heavy ends boiling above 370° C.

In a continuous flow reactor, the reactor will typically have one or more inlets for introducing the plastic feedstock and the catalyst composition. The reactor will further have at least one outlet for removing reaction products from the reactor that is spaced from the one or more inlets along an overall reactor flow path, which may be substantially linear or non-linear. The flow path of the reactor has a length, which may be represented by the designation "L", between the one or more inlets and the outlet or outlets. In certain instances, the inlet from which the measurement L is made may constitute the location where both the plastic feed and catalyst contact one another after being introduced into the reactor, such as when the plastic feed and catalyst are introduced separately through separate inlets. This therefore may not be the location for the actual inlet(s) or inlet nozzle(s) itself where the plastic feed and catalyst do not actually contact one another at such location. Such position may be above or below any particular inlet. For most reactors having a linear configuration, the length L will typically be the length of the reactor as measured between the inlets and outlets. A batch type reactor may also have a similar configuration and the length L, as it is used in the temperature monitoring in accordance with invention, has application to batch reactions and reactors, as well. The length L of the reactor flow path will typically be the measurement between the inlet and outlet that are closest to one another if there are multiple inlets and outlets, unless expressly stated otherwise. In such other cases, the length L may be measured between any inlet and outlet, such as the most distant inlet and outlet, or the distance between intermediate positions located between multiple inlets and/or multiple outlets.

In certain instances, the reactor may have multiple feed and/or catalyst inlets that form local zones within the reactor. Each local zone may have its own local control scheme wherein the length L is the length between the inlet(s) of the particular zone and the outlet(s) of the reactor.

To facilitate monitoring of temperatures where the maximum or most rapid temperature changes occur within the reactor of a continuous flow reactor, temperature measurements are made using appropriate sensors at one or more locations that are adjacent to the inlet or inlets where the plastic and catalyst feed are introduced at a short temperature-monitoring distance. As used herein, the expression "short temperature-monitoring distance" or similar expressions is meant to be construed as the distance that is from 0.3 L or less from the one or more inlets where the catalyst and plastic feed are introduced. In certain embodiments, the short temperature-monitoring distance may be a distance of from 0.2 L or less from the inlet(s). In other embodiments, the short temperature-monitoring distance may be from 0.1 L or less from the inlet(s) or even 0.05 L or less from the inlet(s). The short temperature-monitoring distance may thus be from 0.3 L, 0.2 L, 0.1 L 0.05 L, 0.01 L, 0.005 L, 0.001 L or less from the inlet or inlets.

As an example, in a reactor, such as a fluidized bed riser or downer reactor, having a height or length that defines a flow path that is 18 meters long (i.e., L=18 meters), using 0.3 L or less as the criteria for short temperature-monitoring distance, temperature sensors may be placed from 0 meters to 5.4 meters (i.e., 0.3×18 meters) meters along the reactor flow path from the inlet(s) of the reactor.

In certain embodiments, the temperature measurements may be made at multiple positions such as at 3, 4, 5, 6, 7, 8, 9, or 10 or more different temperature-monitoring locations. Where multiple temperature-monitoring locations are used, some of them may be positioned at long temperature-monitoring distances. As used herein, the expression "long temperature-monitoring distances" is meant to be construed as those distances that are greater than 0.3 L from the one or more inlets where the catalyst and plastic feed are introduced. In most instances, however, at least 1, 2, 3, 4, 5, 6 or more of the temperature-monitoring locations will be within the short temperature-monitoring distance of from 0.3 L, 0.2 L, 0.1 L 0.05 L, 0.01 L, 0.005 L, 0.001 L or less from the inlet or inlets, with the remainder being at a long temperature-monitoring distance along the length of the reactor flow path L.

The temperature measurements may be made at two or more temperature-monitoring locations that may be spaced apart longitudinally and/or laterally at equal or non-equal distances from each other within the reactor. The temperature-monitoring locations may include being laterally spaced apart circumferentially and/or radially from one another in a plane that is perpendicular to a longitudinal axis of the flow path of the reactor at any given point along the reactor flow path. Thus, for example, temperature sensors may be provided near the center of the reactor, others near the reactor walls, and still others at intermediate positions between the center of the reactor and the reactor walls in any angular position. Such temperature sensors that are located at the same distance along the flow path L but that are at different lateral positions may sense a different temperature within the reactor such as due to improper mixing of reactor contents at that particular distance along the flow path.

The various monitored temperatures are continuously or periodically monitored during the course of the reaction. The monitored temperatures are weighted and used in a control scheme for the reactor. In one weighting method, the average temperatures of the monitored temperatures at any given time are averaged together to provide the weighted temperature value. In other instances, different weights can be assigned temperatures monitored at different positions. Thus, different weights may be provided not only to different longitudinal positions but also to lateral positions. For example if you have a core-annulus flow, with the core flow upwards and the annular flow downwards, then one might have lower temperatures near the walls and higher temperatures away from the walls. If for example, the plastic feed is injected in a lower temperature zone, then the reaction yield will be affected adversely, while injecting the plastic feed in a high severity zone the reaction yield be increased. Such weighting, however, in many instances will only be known upon operating a particular reactor unit. In certain cases, one could have a weighted average at lateral and longitudinal positions with the possibility of assigning weights as any fraction from 0 to 1. With whatever weighting method used, the monitored temperatures may be weighted or averaged in a computing block or device in a plant automation control system, such as a distributed control system (DCS), programmable logic controller (PLC), or similar system used for online plant monitoring and control.

The weighted temperature value is then used as an input to a temperature controller that computes the difference in the weighted measured value from a pre-set or pre-selected temperature value (set point) that is suitable for a desired product yield, such as a desired yield of olefins. In response to the difference in the weighted measured temperature and the set point, a controller can be programmed to control the system to provide an appropriate response. This may include altering or adjusting a) the catalyst composition introduced into reactor; b) the flow rate of the catalyst composition into the reactor; c) the flow rate of plastic feedstock into the reactor; and/or d) heat input used to heat the reactor, particularly where an isothermal or a preferred heating profile operation is desired. Such adjustments are usually carried out through the use of control valves actuated by an appropriate actuator.

The response from the controller may be proportionate to the difference of the weighted measured temperature and the set point to provide a proportionate signal to the control valves used for adjusting the various flows of catalyst and plastic feedstock. In this way, it is possible to maintain the weighted measured temperatures very close to the desired set value that provides the greatest yields of the desired products. The controller may be any type of control system suitable for such type of control that uses feedback from the monitored and/or weighted measured temperatures. This may include a proportional, proportional-integral (PI), proportional-integral-derivative (PID), etc., controller, commonly used in industrial process control.

Referring to FIG. 1, a schematic for a plastic conversion system 10 is shown with a particular control system. The conversion system 10 includes a reactor 12, which may be representative of a continuous flow circulating fluidized bed riser reactor or other suitable reactor. In FIG. 1, the reactor/riser 12 is where the reaction occurs when hot catalytic composition from a regenerator contacts the plastic feed. The catalyst along with products and any unconverted feed (heavies) exits the reactor 12 through a termination device and falls into a stripper 14. Here the catalyst is stripped of trapped hydrocarbons using steam. The steam stripped catalyst flows on level control (LIC) 16 via level control valve (LCV) 18 to regenerator 20. In the regenerator 20, the coke on the catalyst composition is burnt using oxygen, air or oxygen enriched air supplied by a blower or piped in and the catalyst is thus regenerated. The hot regenerated catalyst composition from the regenerator flows to the reactor 12 in response to temperature control (TIC) 22 via a temperature controlled valve (TCV) 24 through catalyst inlet 26. Plastic feed is introduced through inlet 28 of the reactor 12. In such reactor there is a continuous flow of feed to and withdrawal of products from the reactor. In the embodiment of FIG. 1, an average of temperatures monitored through different laterally and/or longitudinally positioned sensors 30, 32, 34 located at or a short temperature-monitoring distance (i.e., 0.3 L or less) from the catalyst and feed introduction points 26, 28 located at or near the bottom of the reactor 12 is used for controlling the catalyst flow from catalyst regenerator 20. This zone at or immediately downstream from the feed entry points is where maximum conversion of products occurs, as well as maximum temperature changes. The average temperature of the catalyst bed within this zone has the most impact on the products produced from the conversion process and their yields. This monitoring of and weighted averaging of temperatures solely near the feed and catalyst introduction points correlates to the short time-interval average bed temperatures (i.e. 2 minutes or less) in batch reactors.

The temperatures from the sensors (TE) 30, 32, 34 are periodically or continuously monitored and weighted or averaged in a computing block or device 36 that provides an average measured temperature that is provided as feedback to the temperature controller 22. The temperature sensors are of any suitable type and capable of monitoring catalyst bed temperatures. In the embodiment shown, the controller 22 controls temperature control valve 24 that allows the introduction of hot regenerated catalyst from regenerator 20. When a higher temperature is set, the valve 24 is opened to allow more hot catalyst to flow to the reactor 12 to facilitate the higher heat requirements in the reactor. In other applications, the controller 22 could be used to control other valves for the introduction of plastic feed, to adjust the particular catalyst composition, and/or adjust the heat input from an external heating source, such as where an isothermal or a preferred heating profile operation is desired. In still other embodiments, the controller 22 may be used to control other conditions or flows that facilitate control of the reaction.

In the embodiment shown, other temperature sensors 38, 40, 42, 44 are placed downstream along the length of the reactor 12 for monitoring the reaction but are not used in the process control in this example.

Steam or other fluidizing gas is added at different locations to maintain the proper fluidization and transfer operations. The feed to the reactor may be fed by a multiple of different methods including but not limited by for example through an extruder, by pneumatic transfer using, for example, a fluidizing gas, and through a controlled addition device, etc. Single or multiple cyclones linked by a manifold can be provided on the reactor stripper 14 (cyclone 46) and/or regenerator 20 (cyclone 48) to remove particulate matter exiting with the effluent from these vessels and returning collected particulate matter back to the beds in these vessels.

Figure 2:
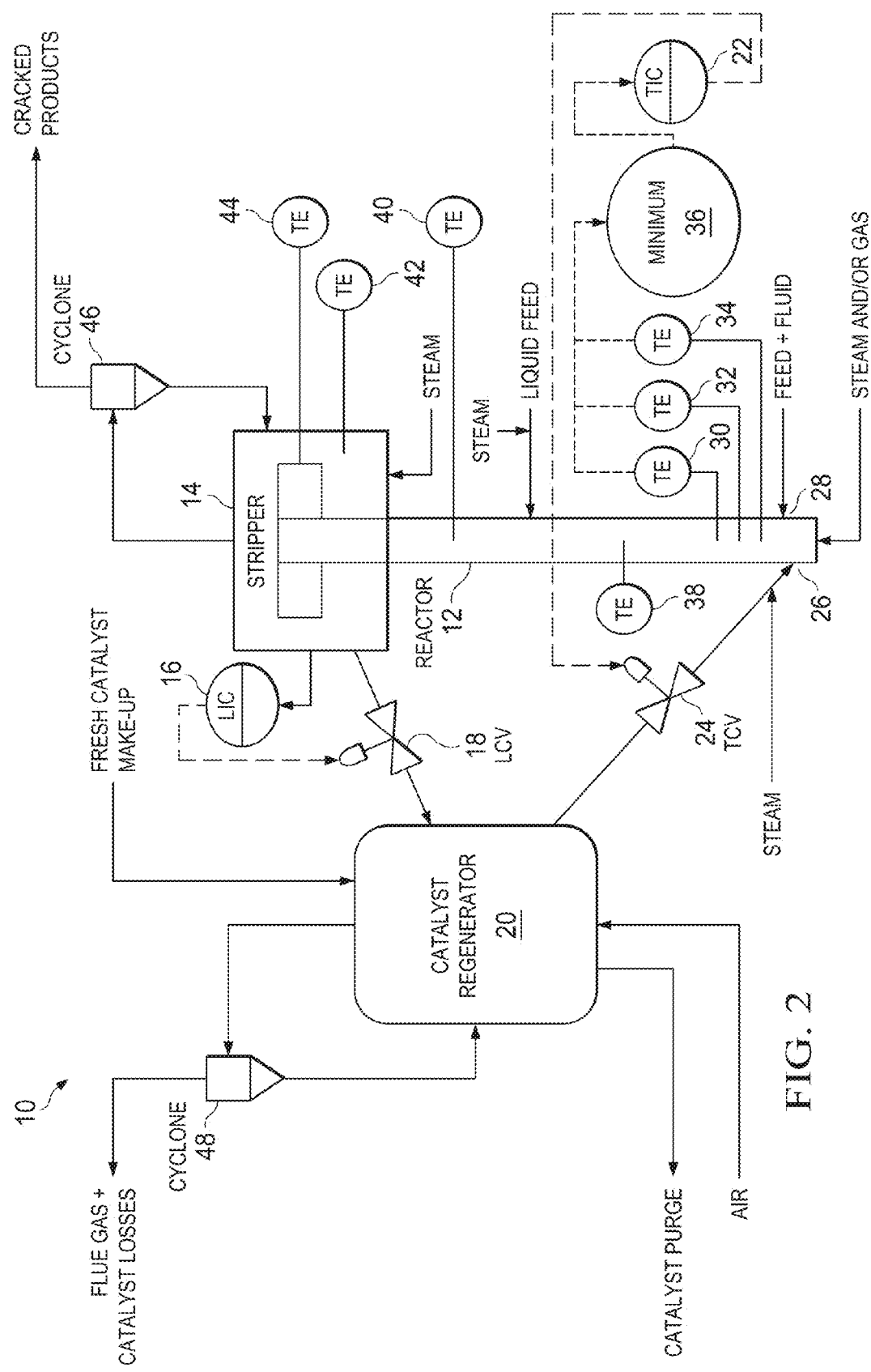
FIG. 2 is a schematic for a control system of a catalytic plastics pyrolysis unit reactor using a minimum longitudinal and lateral temperatures monitored at a short temperature-monitoring distance near the reactor bottom.

Referring to FIG. 2, an alternate schematic for the plastic conversion system 10 of FIG. 1 with a particular control system, with similar components labeled with the same reference numerals, is shown. In this control schematic, the temperatures from the sensors 30, 32, 34 located at or a short temperature-monitoring distance (i.e., 0.3 L or less) from the catalyst and feed introduction points 26, 28 are used to provide a minimum temperature measured immediately after the introduction of feed at the reactor bottom. This is provided to the computing block or device 36 that determines the minimum measured temperature from any one of the sensors 30, 32, 34. This monitoring of minimum temperatures solely near the feed and catalyst introduction points correlates to the minimum bed temperature in batch reactors.

This minimum temperature is periodically or continuously monitored and is provided as feedback to temperature controller (TIC) 22. The point at which the feed and the hot catalyst are well mixed or equilibrated is the point beyond which the temperature may drop further but the drop is less steep as compared to the drop rate encountered prior to this. The well mixed temperature will typically be the lowest measured temperature immediately downstream of the feed introduction point. Based upon the temperature set for the controller 22 the valve 24 is opened to allow the appropriate amount of hot catalyst from the catalyst regenerator 20 to supply the necessary heat requirements in the reactor 12 for supporting the endothermic reaction for the operating throughput and to provide the desired product yields. In other applications, the controller 22 could be used to control other valves for the introduction of plastic feed, to adjust the particular catalyst composition, and/or adjust the heat input from an external heating source, such as where an isothermal or a preferred heating profile operation is desired. In still other embodiments, the controller 22 may be used to control other conditions or flows that facilitate control of the reaction.

Figure 3:
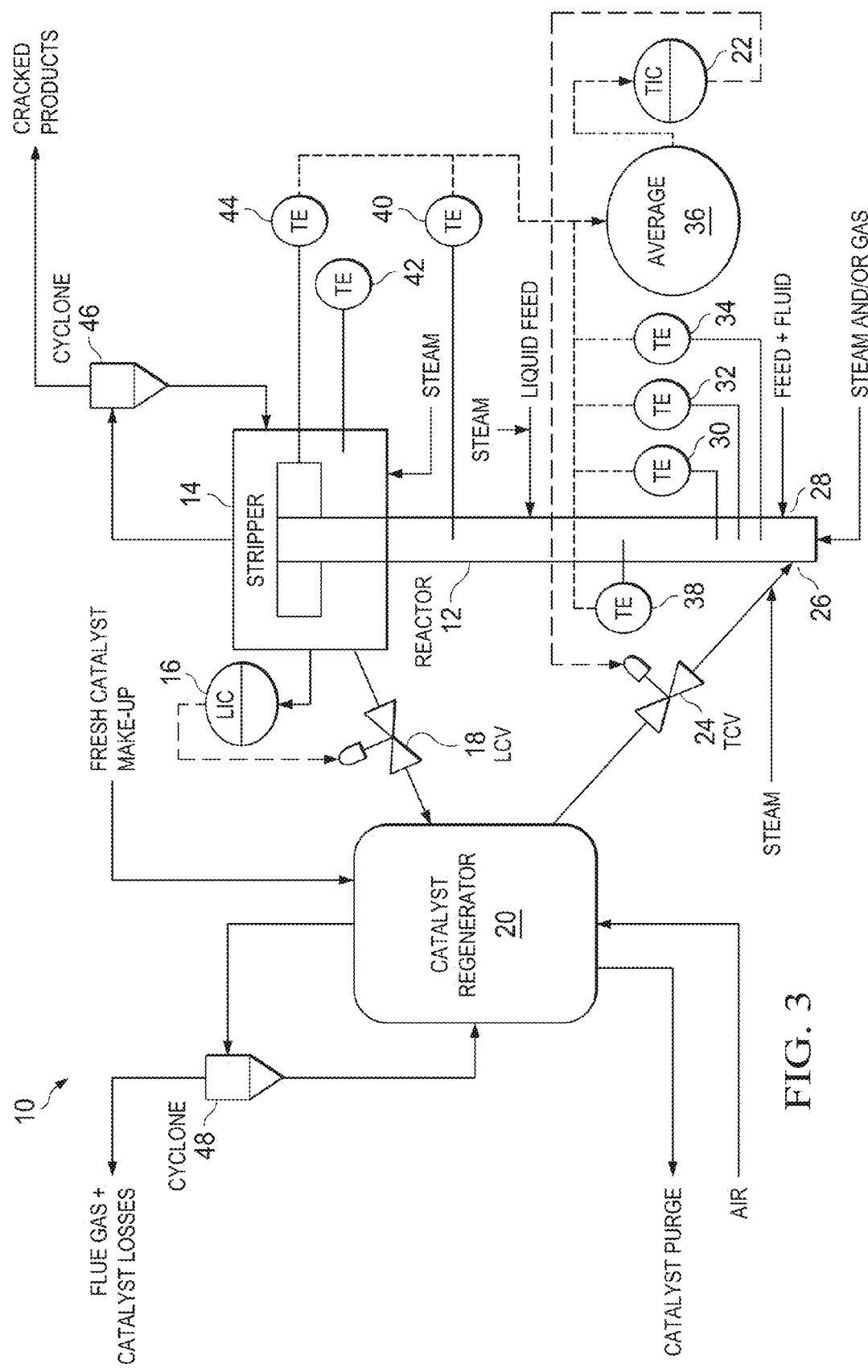
FIG. 3 is a schematic for a control system of a catalytic plastics pyrolysis unit reactor using weighted average longitudinal and lateral temperature monitored at distances along the length of the reactor.

Referring to FIG. 3, another schematic for the plastic conversion system 10 of FIG. 1 with a particular control system, with similar components labeled with the same reference numerals, is shown. In this control schematic, the temperatures from the sensors 30, 32, 34 located at a short temperature-monitoring distance (i.e., 0.3 L or less) from the catalyst and feed introduction points 26, 28 are used in combination with long temperature-monitoring distances (i.e., >0.3 L) from the feed introduction points and may be located along substantially the entire length of the reactor flow path at different positions. Here, measured temperatures monitored with differently located sensors 38, 40 and 44, which are located downstream from sensors 30, 32, 34, are positioned at intermediate portions of the reactor 12 and near the product outlet of the reactor 12. The measured temperatures from sensors 38, 40 and 44 are provided to the computer block of device 36 and weight-averaged with the temperatures from the sensors 30, 32, 34. The computing block 36 provides a weighted-average measured temperature from the sensors 30, 32, 34, 38, 40 and 44, which is provided as feedback to temperature controller (TIC) 22. This correlates to long time-interval average bed temperatures determined in batch reactors, where the bed temperatures are monitored over times of greater than 2 minutes (e.g. 10 minutes) and averaged together.

These temperatures are periodically or continuously monitored, weight-averaged and provided as feedback to temperature controller (TIC) 22. The well mixed temperature will be the lowest measured temperature immediately downstream of the feed introduction point. Based upon the temperature set for the controller 22, the valve 24 is opened to allow the appropriate amount of hot catalyst from the catalyst regenerator 20 to supply the necessary heat requirements in the reactor for supporting the endothermic reaction for the operating throughput and to provide the desired product yields. In other applications, the controller 22 could be used to control other valves for the introduction of plastic feed, to adjust the particular catalyst composition, and/or adjust the heat input from an external heating source, such as where an isothermal or a preferred heating profile operation is desired. In still other embodiments, the controller 22 may be used to control other conditions or flows that facilitate control of the reaction.

The above-described control schemes differ from conventional control schemes used in FCC units in that in conventional control of FCC units only the temperature at the outlet of the reactor is monitored and provided as feedback to any control unit. The temperature near the outlet of the reactor, however, is located at a far distance from where maximum conversion and temperature changes occur within the reactor. This results in a poor correlation with the products and yields that are being produced in the reactor. If the outlet temperature is the sole temperature used as feedback to a controller, it would not provide the desired degree of control or assure the desired yield of products in contrast to the control schemes of the invention.

The pyrolysis products produced in the reactions include light gas olefins, such as ethylene, propylene, butenes, etc., and aromatics, such as benzene, toluene, xylenes, and ethyl benzene. These may be selectively produced in large quantities. Complete conversion of the feed plastics to various products occurs. Products produced include gases ($H_2$—$C_4$), gasoline or naphtha (boiling point 35-220° C.), diesel (boiling point 220-370° C.), a small fraction of heavier stream (boiling point >370° C.) and coke. The yield of various products could be varied by using different catalyst recipe or any or all of the above mentioned parameters including contact time, fluidization flow rate and specific features of the reactor hardware, such as diameter, length or feed and/or gas distribution design or mixing/contacting related hardware modifications, recycles of products into the reactor for further conversion and such other parameters. Saturated products, such as methane, ethane, propane, and butanes, are also produced, as well as hydrogen gas ($H_2$). In testing, low yields of methane and butadiene were obtained (<2 wt. % and 0.5 wt. %, respectively) when employing the particular weighted monitored temperatures. This indicates that even though the weighted temperature severity employed is high (e.g., 550° C. or higher), the observed activity is predominantly probably due to catalytic activity than thermal cracking. The catalyst composition can be used under conditions that successfully suppress methane formation and at the same time offer high conversions and minimize heavy products. The process also minimizes the formation of heavy liquid products, i.e., those product heavy ends boiling above 370° C.

In a continuous flow reactor to provide the desired products of light olefins at desired yields, the reactor is operated to provide a selected weighted or averaged temperature. This may be done according to the control schemes of the invention as they have been described above. In certain embodiments, the reactor is operated to maintain the weighted or average temperature of two or more different monitored temperature locations to be at least 550° C. In some embodiments, the reactor is operated to maintain the weighted or average temperature of two or more different monitored temperature locations to be at least 570° C. or higher. In other embodiments, the reactor is operated to maintain the weighted or average temperature of two or more different monitored temperature locations to be from 550° C. to 730° C., more particularly from 570° C. to 680° C., 690° C. or 700° C.

The pyrolysis products produced can be used in a variety of processes. For example the light gas olefins formed (ethylene, propylene and butenes) can be used in polymerization, the aromatics can be used as building blocks for derivatives or can be used as such in specific applications, the saturated gases can be cracked further to light gas olefins or can be directed to fuel gas ($H_2$—$C_2$) and LPG ($C_3$-$C_4$) pool or can be used as a fuel in the pyrolysis or any other process. The coke formed can be used as an energy source for supplying the necessary heat requirements for the pyrolysis process.

The following examples serve to further illustrate the invention.

EXAMPLES

Example 1

Temperatures in an in-situ fluidized bed lab tubular reactor were monitored in a plastic pyrolysis conversion reaction. The reactor had an inner diameter of 15 mm and was housed in a split-zone 3-zone tubular furnace with each zone (bottom zone, middle zone, top zone) having a length of 236 mm with independent temperature control for each zone. The reactor had a total length of 783 mm with a flow path length of 783 mm, as measured from the bottom of the catalyst bed located in the bottom zone to the reactor outlet located at the top of the reactor in the top zone. The reactor had a conical bottom and temperatures were measured at the top of the reactor bed (i.e. top of the conical bottom) and at the middle of the bottom zone at a distance of 93 mm from the top of the catalyst bed or 118 mm from the bottom of the catalyst bed. The temperatures were measured using a thermocouple housed inside a thermowell and placed inside the reactor at the specified locations. The reactor bottom was placed at the bottom of the furnace bottom zone. The heated length of the reactor placed inside the furnace was 709 mm.

The plastic feeds were in the form of a 200 micron plastic powder. The FCC catalyst was a spent FCC catalyst obtained from an operating refinery. The FCC spent catalyst used had a residual amount of coke at 0.23 wt. %. The ZSM-5 zeolite catalyst used was a commercially available ZSM-5 zeolite catalyst. The plastic feed was mixed with catalyst by swirling in a cup and then fed into the reactor.

As the feed and catalyst were charged into the reactor, the reactor temperatures were monitored, with the results being presented in Table 2 below.

TABLE 2

| | Temperature measurement at the top of the reactor bottom cone | Temperature measurement at the middle of bottom zone |
|---|---|---|
| C/F | 6 | 7 |
| Catalyst recipe | FCC catalyst 50 wt % & ZSM5 additive-50 wt % | FCC catalyst 50 wt % & ZSM5 additive-50 wt % |
| time elapsed after feed introduction, mins | Bed temperature deg C. | Bed temperature deg C. |
| 0 | 600 | 595 |
| 0.17 | 407 | 580 |
| 0.33 | 410 | |
| 0.67 | 452 | |
| 1 | 531 | |
| 2 | 568 | |
| 3 | 589 | |
| 4 | 602 | |
| 5 | 608 | |
| 6 | 611 | |
| 7 | 611 | |
| 8 | 610 | |
| 9 | 608 | |
| 10 | 602 | 592 |

As can be seen in Table 2, as the feed and catalyst were charged the reactor bed temperature dropped quickly, followed by a rapid rise in temperature within the first minute after charging. The local temperature the feed sees once it is inside the reactor determines the amount of cracking that the feed undergoes. When the feed is added with catalyst into the reactor, the reactor bed temperature reduces immediately before starting to rise again. At each temperature value and at each instant of time in the catalyst bed, cracking of the feed occurs at a different rate and results in a different set of products being formed. What is seen as a product at the end of an experiment in a batch tubular reactor is the time averaged (composited) product yield. Since most of the temperature changes occur in the first minute (as shown in Table 2 above), an average temperature of the reactor catalyst bed for this duration is more likely to predict the product yields than either the set reaction temperature before the start of the reaction or a time averaged reaction bed temperatures over a longer period of time. Referring to Table 2, the set reaction temperature before the start of reaction was 600° C., the one-minute average temperature was 480° C. and the 10-minute average temperature (longer period of time) average was 557.7° C. The longer period of time averaged temperature does not truly reflect the reaction severity because most of the products have been liberated out at a lower temperature. The set temperature before the start of reaction also would not truly reflect reaction severity as there are extreme temperature changes that occur during the reaction.

If a higher value is set for this averaged temperature, either a one-minute time average in lab batch reactor or a space-averaged temperature (i.e., from a short temperature-monitoring distance) in continuous flow reactor, during continuous operations on a large scale, then this temperature criterion can be satisfied in a circulating fluidized bed by a higher flow rate of hot catalyst. Both of these, i.e. the higher temperature and the higher catalyst availability, would then result in a higher light gas olefin yield.

Experimental for Examples 2-10

In each of the examples presented below, the same reactor as used in Example 1 was used. In the examples, the overall heated length of the reactor placed inside the furnace was 591 mm. The reactor wall temperature was measured at the center of each zone and was used to control the heating of each furnace zone. The reactor had a conical bottom and the reactor bed temperature was measured using a thermocouple housed inside a thermowell and placed inside the reactor at the top of the conical bottom. Also, the reactor wall temperature was measured at the conical bottom to ensure that the bottom of the reactor was hot. The reactor bottom was placed at the middle of the furnace bottom zone for minimizing the effect of furnace end cap heat losses and maintaining the reactor bottom wall temperature within a difference of 20° C. of the internal bed temperature measured.

The plastic feeds were in the form of a 200 micron plastic powder. The FCC catalyst was a spent FCC catalyst obtained from an operating refinery. The FCC spent catalyst used had a residual coke on it of 0.23 wt %. The ZSM-5 zeolite catalyst used was a commercially available ZSM-5 zeolite catalyst. The plastic feed was mixed with catalyst by swirling in a cup and then fed into the reactor. The plastic feed had the composition set forth in Table 3 below.

TABLE 3

| Material | Amount |
|---|---|
| HDPE | 19 wt. % |
| LDPE | 21 wt. % |
| PP | 24 wt. % |
| C4-LLDPE | 12 wt. % |
| C6-LLDPE | 6 wt. % |
| PS | 11 wt. % |
| PET | 7 wt. % |

The conversion products from the reactor were collected and condensed in a condenser. The uncondensed products were collected in a gas collection vessel and the gas composition was analyzed using a refinery gas analyzer (M/s AC Analyticals B.V., The Netherlands). Liquid products were characterized for their boiling point distribution using a simulated distillation GC (M/s AC Analyticals B.V., The Netherlands). In addition a detailed hydrocarbon analysis (up to C13 hydrocarbons) was carried out using a DHA analyzer (M/s AC Analyticals B.V., The Netherlands). The coke deposited on the catalyst was determined using an IR-based CO and $CO_2$ analyzer. The mass balances were determined by summing the yields of gas, liquid and coke. Individual product yields were determined and reported on a normalized product basis.

Example 2

Figure 4:
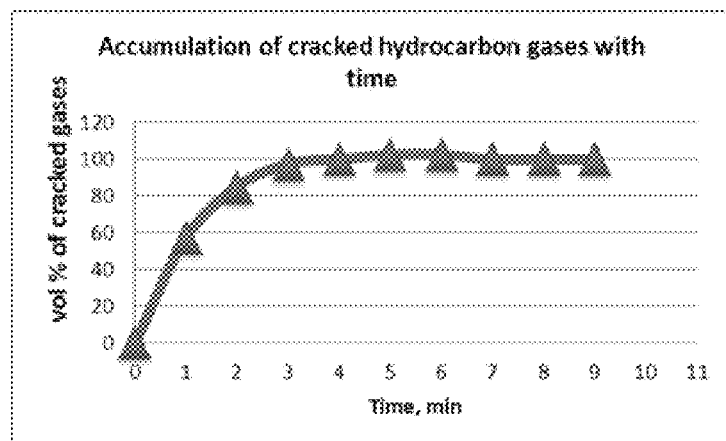
FIG. 4 is a plot of the percentage of evolved cracked gas products over time in a plastic pyrolysis conversion reaction.

Pyrolysis conversion was conducted on the plastic feed at the reaction conditions presented in Table 4 below. The results are presented in Table 5 and in FIG. 4. As can be seen from Table 5 and FIG. 4, most of the cracked hydrocarbon product gases (i.e., $H_2$ and $C_1$-$C_6$) were produced during the first three (3) minutes, with the majority being produced in the first minute in the lab reactor. The volume of cracked hydrocarbon gas collected was determined by subtracting the $N_2$ gas flow admitted during the reaction from the total gas volume collected. The cracked hydrocarbon gas volume % is obtained by dividing this accumulated cracked gas volume till any instant by the total gas volume collected till that instant.

TABLE 4

| | wt % | Catalyst composition<br>Spent FCC(75%) + ZSM5 zeolite catalyst (25%) |
|---|---|---|
| C/F ratio | g/g | 5.98 |
| Reaction temperature at start | ° C. | 640 |
| Fluidization Nitrogen flow | cc/min | 250 |
| Dry catalyst fed | g | 5.99 |
| Feed weight transferred | g | 1.00 |

TABLE 5

| Time in mins | Total $N_2$ flow admitted including fluidization flows, CC | Total gas collected, CC | Hydrocarbon gas collected, CC | Hydrocarbon cracked gas collected, vol % |
|---|---|---|---|---|
| 0 | 0 | 0 | 0 | 0 |
| 1 | 620 | 850 | 230 | 57.5 |
| 2 | 990 | 1330 | 340 | 85 |
| 3 | 1350 | 1740 | 390 | 97.5 |
| 4 | 1720 | 2120 | 400 | 100 |
| 5 | 2080 | 2490 | 410 | 102.5 |
| 6 | 2440 | 2850 | 410 | 102.5 |
| 7 | 2800 | 3200 | 400 | 100 |
| 8 | 3150 | 3550 | 400 | 100 |
| 9 | 3500 | 3900 | 400 | 100 |

Example 3

Figure 5:
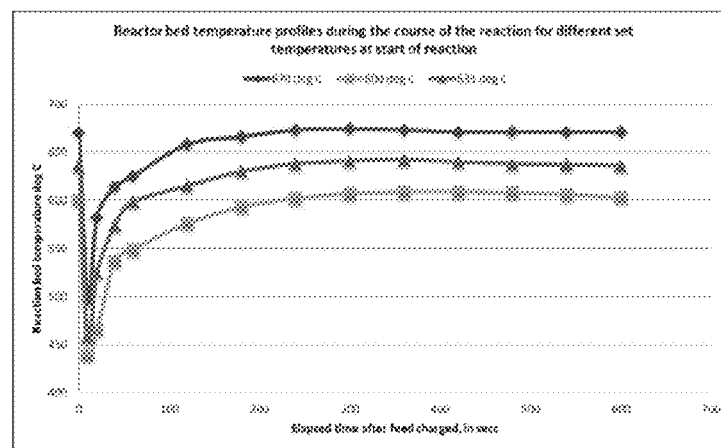
FIG. 5 is a plot of reactor bed temperature profiles during the course of plastic pyrolysis conversion reactions at different reactor set temperatures at the start of the reaction.

Tests to determine the effect of start reactor temperatures were conducted by varying these temperatures from 600-670° C. The reaction conditions are presented in Table 6 below. These experiments were conducted using a catalyst mixture containing 75 wt. % spent FCC catalyst and 25 wt. % ZSM5 zeolite catalyst. Plastic feed weight used was 0.75 g. Fluidization $N_2$ gas flow used was 175N cc/min. The results are presented in Table 7 and in FIG. 5. As can be seen from Table 7 and FIG. 5, the reactor bed temperature regained its initial value more rapidly when the set reaction temperature value at the start was higher. This indicates that the cracking under these process conditions is very rapid.

TABLE 6

| | wt % | Catalyst composition | | |
|---|---|---|---|---|
| | | Spent FCC catalyst (75%) + ZSM5 zeolite catalyst (25%) | Spent FCC catalyst (75%) + ZSM5 zeolite catalyst (25%) | Spent FCC catalyst (75%) + ZSM5 zeolite catalyst (25%) |
| C/F ratio | g/g | 9.0 | 9.0 | 9.0 |
| Reaction temperature at start | ° C. | 600 | 635 | 670 |
| Dry catalyst fed | g | 6.78 | 6.78 | 6.77 |
| Feed weight transferred | g | 0.75 | 0.75 | 0.75 |

TABLE 7

| Time in Seconds elapsed after charging pre-mixed feed and catalyst mixture | Reaction temperature at start 600° C. | Reaction temperature at start 635° C. | Reaction temperature at start 670° C. |
|---|---|---|---|
| 0 | 600 | 635 | 670 |
| 10 | 439 | 458 | 496 |
| 20 | 466 | 525 | 582 |
| 40 | 537 | 574 | 614 |
| 60 | 549 | 598 | 625 |
| 120 | 576 | 615 | 658 |
| 180 | 593 | 630 | 666 |
| 240 | 602 | 638 | 673 |
| 300 | 607 | 641 | 674 |
| 360 | 609 | 642 | 673 |
| 420 | 609 | 640 | 671 |
| 480 | 608 | 638 | 671 |
| 540 | 606 | 637 | 671 |
| 600 | 603 | 636 | 671 |

Example 4

Figure 6:
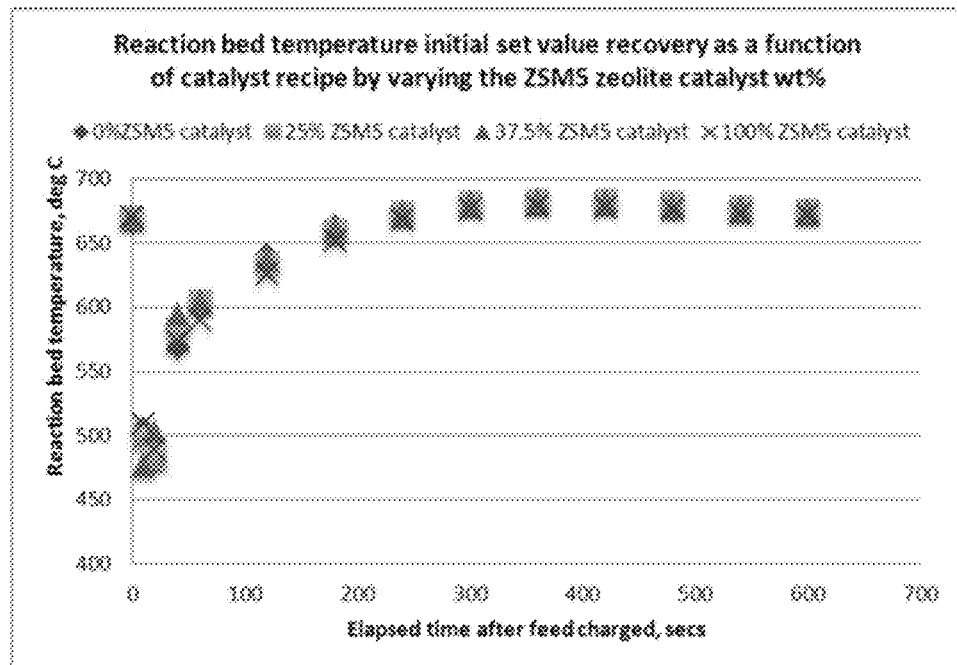
FIG. 6 is a plot of reactor bed temperature profiles during the course of plastic pyrolysis conversion reactions for different catalyst compositions.

Tests to determine the effect of the catalyst composition on reaction bed temperature recovery were conducted. Experiments were conducted using spent FCC catalyst with varying amounts of ZSM-5 zeolite catalyst (i.e., 0 to 100%). The plastic feed composition used was as provided in Table 3 above. About 9 g of catalyst(s) and 1.5 g of plastic feed were used. A flow of $N_2$ gas at 175N cc/min (normal cc/min) was used as a fluidizing gas. The reaction was carried out at a set start temperature of 670° C. and a C/F ratio of approximately 6. The results are presented in Table 8 and FIG. 6. As can be seen in FIG. 6, the bed temperature regain after the start of the run is less rapid when 100% ZSM-5 catalyst is used, as compared to a mixture of the spent FCC catalyst and the ZSM-5 catalyst. In the case of the catalyst composition containing 37.5 wt. % ZSM-5 zeolite catalyst, the minimum reactor bed temperature reached its lowest and the reactor bed temperature recovery was faster compared to the others. This indicates that the cracking under these process conditions is very rapid.

TABLE 8

|  | Spent FCC catalyst (100 wt %) | Spent FCC (75 wt %) + ZSM5 Zeolite catalyst (25 wt %) | Spent FCC(62.50 wt %) + ZSM5 Zeolite catalyst (37.5 wt %) | ZSM5 Zeolite catalyst (100 wt %) |
|---|---|---|---|---|
| C/F ratio | 6.00 | 5.98 | 5.97 | 5.91 |
| Catalyst dry weight, g | 8.9992 | 8.9685 | 8.9492 | 8.8665 |
| Feed weight, g | 1.4997 | 1.5 | 1.499 | 1.5005 |
| Reaction start temperature, ° C. | 670 | 670 | 670 | 670 |

| Time in Seconds elapsed after charging pre-mixed feed and catalyst mixture | Bed temperature at a particular instant after charging of feed and catalyst mixture, ° C. | Bed temperature at a particular instant after charging of feed and catalyst mixture, ° C. | Bed temperature at a particular instant after charging of feed and catalyst mixture, ° C. | Bed temperature at a particular instant after charging of feed and catalyst mixture, ° C. |
|---|---|---|---|---|
| 0 | 670 | 670 | 670 | 670 |
| 10 | 505 | 498 | 477 | 509 |
| 20 | 479 | 483 | 503 | 489 |
| 40 | 569 | 583 | 594 | 573 |
| 60 | 605 | 605 | 604 | 590 |
| 120 | 641 | 635 | 637 | 626 |
| 180 | 663 | 660 | 661 | 652 |
| 240 | 674 | 674 | 674 | 668 |
| 300 | 681 | 681 | 681 | 676 |
| 360 | 682 | 683 | 683 | 679 |
| 420 | 682 | 683 | 682 | 678 |
| 480 | 679 | 681 | 680 | 676 |
| 540 | 676 | 678 | 677 | 673 |
| 600 | 674 | 675 | 675 | 672 |

Example 5

Figure 7:
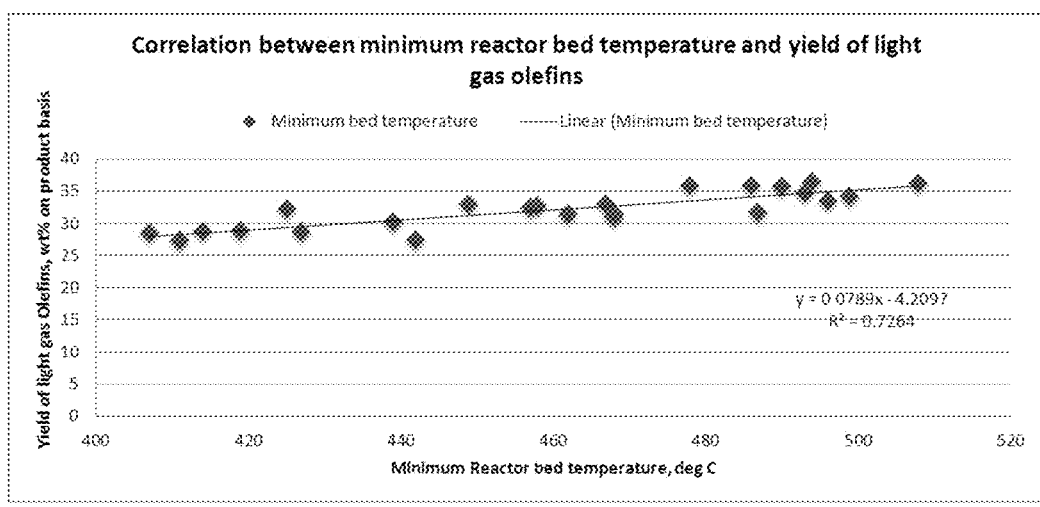
FIG. 7 is a plot of total light gas olefin yields as a function of minimum reactor bed temperatures in plastic pyrolysis conversion reactions.
Figure 8:
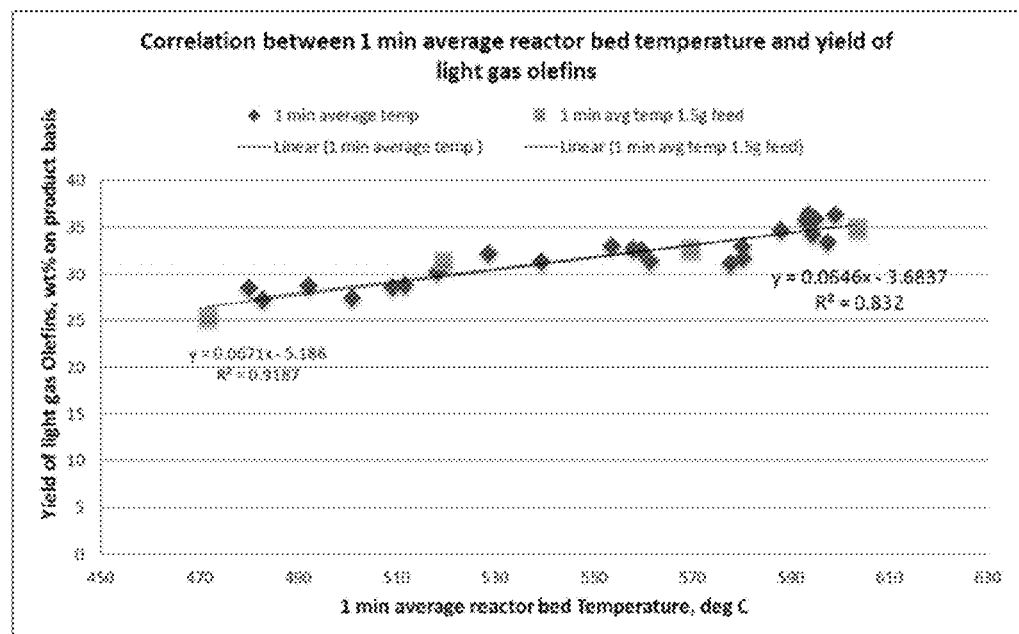
FIG. 8 is a plot of total light gas olefin yields as a function of one-minute average reactor bed temperatures in plastic pyrolysis conversion reactions.
Figure 9:
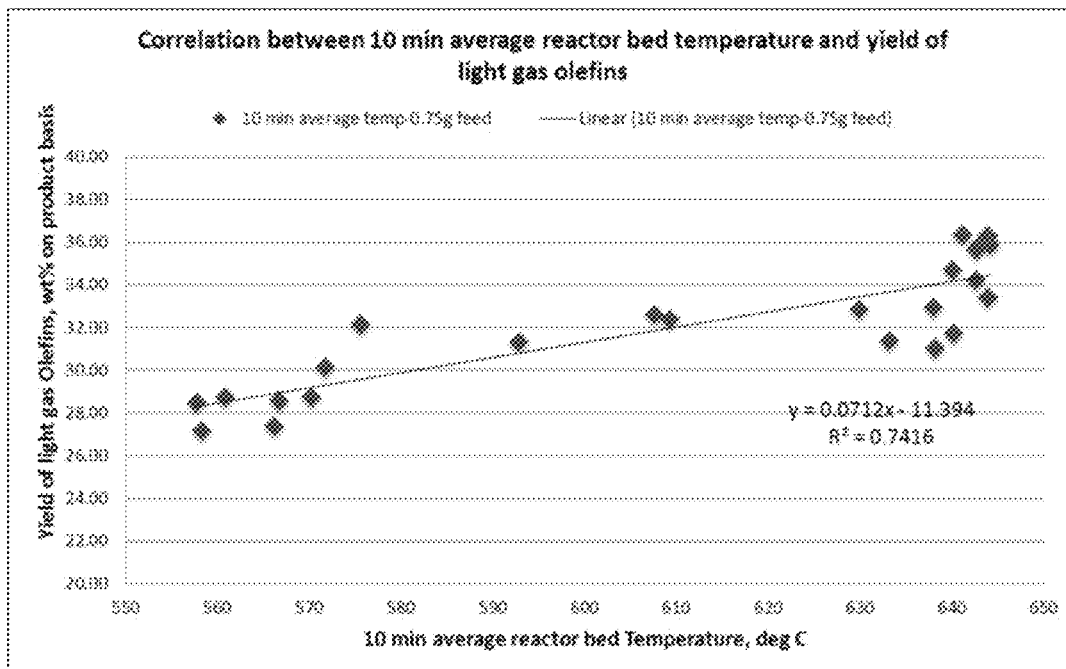
FIG. 9 is a plot of total light gas olefin yields as a function of ten-minute average reactor bed temperatures in plastic pyrolysis conversion reactions.

Tests to determine the correlation of the minimum reactor bed temperature and total light gas olefin yields (i.e., the total of C2+C3+C4 olefins) were conducted. The amount of ZSM-5 zeolite catalyst in the catalyst mixture containing FCC catalysts and ZSM5 zeolite catalyst was varied from 25-50 wt. %. The C/F ratio was varied from 6-9 and a plastic feed of 0.75 g was used. The fluidization $N_2$ gas flow employed was 175N cc/min. The reaction temperature before the start of reaction was varied from 600-670° C. The results using minimum reactor bed temperature for these different experiments are presented in FIG. 7 and Tables 9A-9E below. Similar results are seen when either a one-minute average reactor bed temperature (FIG. 8) or ten-minute average reactor bed temperature (FIG. 9) were used. FIG. 8 also shows the one-minute average reactor bed temperature when 1.5 g of plastic feed for a C/F ratio of 6 was used. Both the data appear to exhibit the correlation between the one-minute average reactor bed temperature and the yields of light gas olefins.

TABLE 9A

| Experiment No. | 1 | 2 | 3 | 4 | 5 | 6 |
|---|---|---|---|---|---|---|
| Catalyst Composition, wt % | Spent FCC(62.50%) + ZSM5 Zeolite Catalyst (37.5%) | Spent FCC(62.50%) + ZSM5 Zeolite catalyst (37.5%) | Spent FCC(75%) + ZSM5 Zeolite Catalyst (25%) | Spent FCC(50%) + ZSM5 zeolite catalyst (50%) | Spent FCC(75%) + ZSM5 zeolite catalyst (25%) | Spent FCC(62.50%) + ZSM5 zeolite catalyst (37.5%) |
| C/F ratio, g/g | 9.0 | 9.01 | 9.0 | 9.0 | 9.0 | 6.0 |
| Reaction temperature at start, ° C. | 670 | 670 | 670 | 670 | 600 | 670 |
| Dry catalyst fed, g | 6.76 | 6.76 | 6.77 | 6.75 | 6.78 | 4.48 |
| Feed weight transferred, g | 0.75 | 0.75 | 0.75 | 0.75 | 0.75 | 0.75 |

| Time in Seconds elapsed after charging pre-mixed feed and catalyst mixture | Bed temperature at a particular instant after charging of feed and catalyst mixture, ° C. | Bed temperature at a particular instant after charging of feed and catalyst mixture, ° C. | Bed temperature at a particular instant after charging of feed and catalyst mixture, ° C. | Bed temperature at a particular instant after charging of feed and catalyst mixture, ° C. | Bed temperature at a particular instant after charging of feed and catalyst mixture, ° C. | Bed temperature at a particular instant after charging of feed and catalyst mixture, ° C. |
|---|---|---|---|---|---|---|
| 0 | 670 | 670 | 670 | 670 | 600 | 670 |
| 10 | 494 | 508 | 496 | 499 | 439 | 468 |
| 20 | 575 | 582 | 582 | 576 | 466 | 550 |
| 40 | 608 | 613 | 614 | 607 | 537 | 590 |

TABLE 9A-continued

| Experiment No. | 1 | 2 | 3 | 4 | 5 | 6 |
|---|---|---|---|---|---|---|
| 60 | 621 | 622 | 625 | 620 | 549 | 611 |
| 120 | 648 | 650 | 658 | 649 | 576 | 646 |
| 180 | 663 | 665 | 666 | 665 | 593 | 665 |
| 240 | 671 | 673 | 673 | 673 | 602 | 675 |
| 300 | 673 | 675 | 674 | 676 | 607 | 679 |
| 360 | 672 | 674 | 673 | 675 | 609 | 680 |
| 420 | 671 | 672 | 671 | 673 | 609 | 679 |
| 480 | 670 | 670 | 671 | 672 | 608 | 676 |
| 540 | 670 | 670 | 671 | 671 | 606 | 673 |
| 600 | 670 | 670 | 671 | 671 | 603 | 672 |
| Minimum Temperature | 494 | 508 | 496 | 499 | 439 | 468 |
| 1 min average Temperature | 593.6 | 599 | 597.4 | 594.4 | 518.2 | 577.8 |
| 10 mins average Temperature | 641.1 | 643.9 | 643.9 | 642.6 | 571.7 | 638.1 |

TABLE 9B

| Experiment No. | 7 | 8 | 9 | 10 | 11 | 12 |
|---|---|---|---|---|---|---|
| Catalyst Composition, wt % | Spent FCC(50%) + ZSM5 Zeolite Catalyst (50%) | Spent FCC(62.50%) + ZSM5 Zeolite Catalyst (37.5%) | Spent FCC(50%) + ZSM5 Zeolite Catalyst (50%) | Spent FCC(75%) + ZSM5 Zeolite Catalyst (25%) | Spent FCC(75%) + ZSM5 Zeolite Catalyst (25%) | Spent FCC(75%) + ZSM5 Zeolite Catalyst (25%) |
| C/F ratio, g/g | 9.0 | 6.0 | 7.5 | 6.0 | 9.0 | 7.5 |
| Reaction temperature at start, °C. | 600 | 600 | 670 | 670 | 635 | 670 |
| Dry catalyst fed, g | 6.75 | 4.48 | 5.61 | 4.49 | 6.78 | 5.63 |
| Feed weight transferred, g | 0.75 | 0.75 | 0.75 | 0.75 | 0.75 | 0.75 |

| Time in Seconds elapsed after charging pre-mixed feed and catalyst mixture | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. |
|---|---|---|---|---|---|---|
| 0 | 600 | 600 | 670 | 670 | 635 | 670 |
| 10 | 425 | 411 | 493 | 487 | 458 | 467 |
| 20 | 525 | 411 | 574 | 534 | 525 | 540 |
| 40 | 542 | 459 | 591 | 598 | 574 | 605 |
| 60 | 551 | 533 | 612 | 613 | 598 | 619 |
| 120 | 582 | 570 | 642 | 647 | 615 | 641 |
| 180 | 596 | 590 | 663 | 667 | 630 | 667 |
| 240 | 604 | 602 | 673 | 677 | 638 | 675 |
| 300 | 607 | 607 | 677 | 681 | 641 | 678 |
| 360 | 608 | 609 | 677 | 682 | 642 | 678 |
| 420 | 607 | 609 | 675 | 681 | 640 | 675 |
| 480 | 606 | 608 | 672 | 678 | 638 | 673 |
| 540 | 603 | 605 | 671 | 675 | 637 | 672 |
| 600 | 602 | 603 | 671 | 672 | 636 | 672 |
| Minimum Temperature | 425 | 411 | 493 | 487 | 458 | 467 |
| 1 min average Temperature | 528.6 | 482.8 | 588 | 580.4 | 558 | 580.2 |
| 10 min average Temperature | 575.6 | 558.4 | 640.1 | 640.1 | 607.6 | 638.0 |

TABLE 9C

| Experiment No. | 13 | 14 | 15 | 16 | 17a | 17b |
|---|---|---|---|---|---|---|
| Catalyst Composition, wt % | Spent FCC(75%) + ZSM5 Zeolite Catalyst (25%) | Spent FCC(50%) + ZSM5 Zeolite Catalyst (50%) | Spent FCC(50%) + ZSM5 Zeolite Catalyst (50%) | Spent FCC(62.50%) + ZSM5 Zeolite Catalyst (37.5%) | Spent FCC(62.50%) + ZSM5 Zeolite Catalyst (37.5%) | Spent FCC(62.50%) + ZSM5 Zeolite Catalyst (37.5%) |
| C/F ratio, g/g | 6.0 | 6.0 | 6.0 | 7.0 | 9.0 | 9.0 |
| Reaction temperature at start, °C. | 600 | 600 | 670 | 623 | 670 | 670 |
| Dry catalyst fed, g | 4.49 | 4.47 | 4.47 | 5.22 | 6.76 | 6.76 |
| Feed weight transferred, g | 0.75 | 0.75 | 0.75 | 0.75 | 0.75 | 0.75 |
| Time in Seconds elapsed after charging pre-mixed feed and catalyst mixture | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. |
| 0 | 600 | 600 | 670 | 623 | 670 | 670 |
| 10 | 419 | 407 | 449 | 468 | 490 | 486 |
| 20 | 420 | 410 | 464 | 489 | 575 | 585 |
| 40 | 481 | 452 | 580 | 551 | 609 | 611 |
| 60 | 541 | 531 | 605 | 566 | 621 | 623 |
| 120 | 572 | 568 | 643 | 600 | 648 | 650 |
| 180 | 591 | 589 | 664 | 615 | 666 | 667 |
| 240 | 601 | 602 | 676 | 624 | 674 | 674 |
| 300 | 606 | 608 | 681 | 629 | 677 | 676 |
| 360 | 607 | 611 | 682 | 630 | 677 | 675 |
| 420 | 607 | 611 | 680 | 629 | 675 | 672 |
| 480 | 605 | 610 | 678 | 627 | 672 | 671 |
| 540 | 602 | 608 | 674 | 625 | 671 | 671 |
| 600 | 601 | 602 | 672 | 624 | 671 | 670 |
| Minimum Temperature | 419 | 407 | 449 | 468 | 490 | 486 |
| 1 min average Temperature | 492.2 | 480 | 553.6 | 539.4 | 593 | 595 |
| 10 min average Temperature | 560.9 | 557.8 | 629.9 | 592.9 | 642.6 | 642.9 |

TABLE 9D

| Experiment No. | 17c | 18 | 19 | 20 | 21 | 22 |
|---|---|---|---|---|---|---|
| Catalyst Composition, wt % | Spent FCC(62.50%) + ZSM5 Zeolite Catalyst (37.5%) | Spent FCC(62.50%) + ZSM5 Zeolite Catalyst (37.5%) | Spent FCC(62.50%) + ZSM5 Zeolite Catalyst (37.5%) | Spent FCC(62.50%) + ZSM5 Zeolite Catalyst (37.5%) | Spent FCC(62.50%) + ZSM5 Zeolite Catalyst (37.5%) | Spent FCC(50%) + ZSM5 Zeolite Catalyst (50%) |
| C/F ratio, g/g | 9.0 | 9.0 | 6.0 | 9.0 | 6.0 | 9.0 |
| Reaction temperature at start, °C. | 670 | 600 | 600 | 600 | 670 | 635 |
| Dry catalyst fed, g | 6.76 | 6.76 | 4.48 | 6.76 | 4.48 | 6.75 |
| Feed weight transferred, g | 0.75 | 0.75 | 0.75 | 0.75 | 0.75 | 0.75 |
| Time in Seconds elapsed after charging pre-mixed feed and catalyst mixture | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. | Bed temperature at a particular instant after charging of feed and catalyst mixture, °C. |
| 0 | 670 | 600 | 600 | 600 | 670 | 635 |
| 10 | 478 | 427 | 442 | 414 | 462 | 457 |
| 20 | 588 | 441 | 461 | 456 | 479 | 546 |

TABLE 9D-continued

| Experiment No. | 17c | 18 | 19 | 20 | 21 | 22 |
|---|---|---|---|---|---|---|
| 40 | 611 | 532 | 481 | 538 | 588 | 576 |
| 60 | 623 | 546 | 521 | 550 | 608 | 585 |
| 120 | 651 | 572 | 564 | 575 | 645 | 613 |
| 180 | 668 | 592 | 590 | 594 | 667 | 632 |
| 240 | 676 | 601 | 603 | 604 | 677 | 640 |
| 300 | 680 | 605 | 610 | 609 | 680 | 644 |
| 360 | 679 | 606 | 613 | 611 | 683 | 645 |
| 420 | 677 | 606 | 614 | 611 | 681 | 643 |
| 480 | 674 | 603 | 613 | 610 | 678 | 640 |
| 540 | 672 | 602 | 610 | 607 | 674 | 638 |
| 600 | 671 | 601 | 606 | 605 | 672 | 636 |
| Minimum Temperature | 478 | 427 | 442 | 414 | 462 | 457 |
| 1 min average Temperature | 594 | 509.2 | 501 | 511.6 | 561.4 | 559.8 |
| 10 min average Temperature | 644.1 | 566.7 | 566.3 | 570.3 | 633.1 | 609.3 |

TABLE 9E

| Experiment No. | 23 | 24 | 25 | 26 |
|---|---|---|---|---|
| Catalyst Composition, wt % | Spent FCC(62.50%) + ZSM5 Zeolite Catalyst (37.50%) | Spent FCC(62.50%) + ZSM5 Zeolite Catalyst (37.50%) | Spent FCC(62.50%) + ZSM5 Zeolite Catalyst (37.50%) | Spent FCC(62.50%) + ZSM5 Zeolite Catalyst (37.50%) |
| C/F ratio, g/g | 6.0 | 6.0 | 5.97 | 5.96 |
| Reaction temperature at start, ° C. | 700 | 670 | 635 | 600 |
| Dry catalyst fed, g | 8.95 | 8.95 | 8.95 | 8.95 |
| Feed weight transferred, g | 1.50 | 1.50 | 1.50 | 1.50 |
| Time in Seconds elapsed after charging pre-mixed feed and catalyst mixture | Bed temperature at a particular instant after charging of feed and catalyst mixture, ° C. | Bed temperature at a particular instant after charging of feed and catalyst mixture, ° C. | Bed temperature at a particular instant after charging of feed and catalyst mixture, ° C. | Bed temperature at a particular instant after charging of feed and catalyst mixture, ° C. |
| 0 | 700 | 670 | 635 | 600 |
| 10 | 494 | 477 | 431 | 408 |
| 20 | 569 | 503 | 453 | 412 |
| 40 | 619 | 594 | 519 | 439 |
| 60 | 635 | 604 | 559 | 500 |
| 120 | 669 | 637 | 596 | 556 |
| 180 | 693 | 661 | 622 | 581 |
| 240 | 705 | 674 | 636 | 595 |
| 300 | 711 | 681 | 645 | 604 |
| 360 | 712 | 683 | 649 | 607 |
| 420 | 711 | 682 | 650 | 608 |
| 480 | 708 | 680 | 649 | 607 |
| 540 | 704 | 677 | 648 | 605 |
| 600 | 703 | 675 | 645 | 603 |
| Minimum Temperature | 494 | 477 | 431 | 408 |
| 1 min average Temperature | 603.4 | 569.6 | 519.4 | 471.8 |
| 10 min average Temperature | 666.6 | 635.6 | 595.5 | 551.8 |

From this, the yields of light gas olefins may be predicted over a range of catalyst compositions, temperatures and feed weights. A correlation can therefore be used for predicting light gas olefin yields over a range of conditions. While in the case of a batch tubular reactor a one-minute average temperature can be used, in the case of a continuous flow reactor, this could be replaced by longitudinal and lateral average temperature over a short temperature-monitoring distance (e.g., 0.3 L or less). This type of correlation can be used to target different yields of light gas olefins in both lab and large scale plant operations.

Example 6

Figure 10:
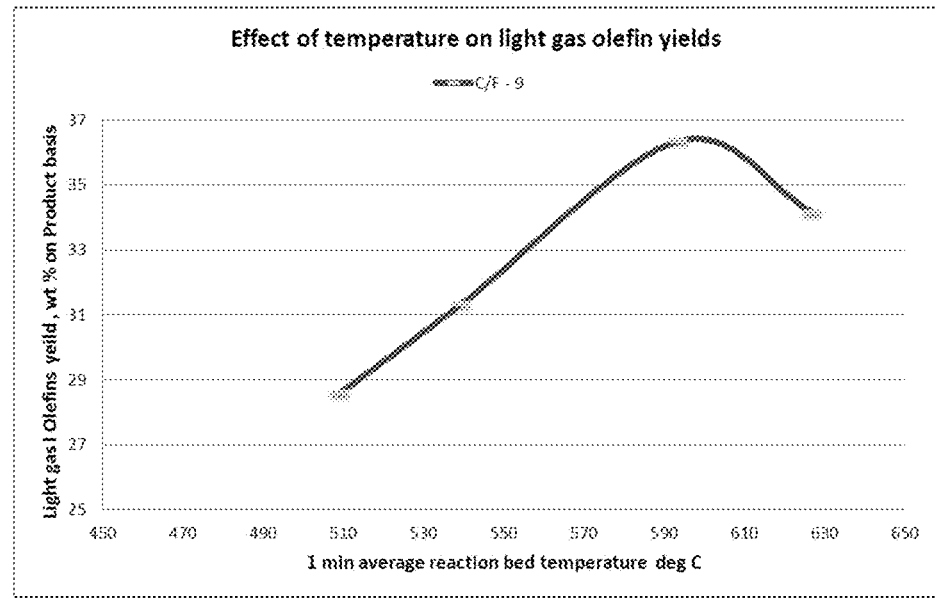
FIG. 10 is a plot of light gas olefin yields as a function of one-minute average reactor bed temperatures in plastic pyrolysis conversion reactions using a specific catalyst composition.
Figure 11:
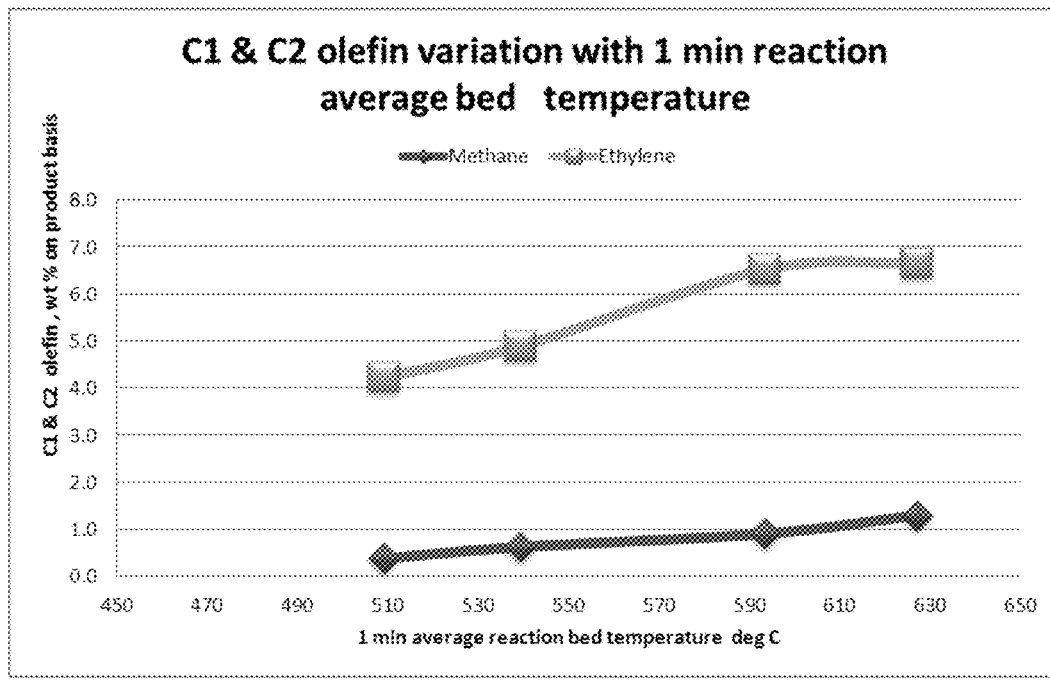
FIG. 11 is a plot of methane and ethylene yields as a function of one-minute average reactor bed temperatures in plastic pyrolysis conversion reactions using a specific catalyst composition.

Tests were conducted to determine the maximum yield of light gas olefins based on the one-minute average reactor bed temperatures. The catalyst was composed of 37.5 wt. % ZSM-5 zeolite catalyst, with the remainder being spent FCC catalyst. Temperatures at start of reactions were varied from 600-700° C. to get a variation of one-minute average reaction temperatures from 509-627° C. The feed weight used was 0.75 g of plastic feed was used with a C/F ratio of 9. Fluidization $N_2$ gas flow applied was 175N cc/min. The results are presented in FIGS. 10 and 11 and in Table 10. From FIG. 10, it can be seen that a one-minute average reaction bed temperature of 570° C. or more helps in maximizing light gas olefin products. As can be seen from FIG. 11, methane yields were suppressed while ethylene yields were increased substantially even when one-minute average reaction bed temperature was higher than 600° C.

TABLE 10

| | Wt. % | Spent FCC(62.50%) + ZSM5 Zeolite Catalyst (37.5%) | Spent FCC(62.50%) + ZSM5 Zeolite Catalyst (37.5%) | Spent FCC(62.50%) + ZSM5 Zeolite Catalyst (37.5%) | Spent FCC(62.50%) + ZSM5 Zeolite Catalyst (37.5%) |
|---|---|---|---|---|---|
| | | Catalyst composition | | | |
| C/F ratio | g/g | 9.0 | 7.0 | 9.0 | 9.95 |
| Reaction temperature at start | ° C. | 600 | 623 | 670 | 700 |
| 1 min average reaction bed temperature | ° C. | 509.2 | 539.4 | 593.6 | 627 |
| Bone Dry catalyst fed | g | 6.76 | 5.22 | 6.76 | 7.46 |
| Feed weight transferred | g | 0.75 | 0.75 | 0.75 | 0.75 |
| Total olefins ($C_2 + C_3 + C_4$) | Wt. % | 28.58 | 31.32 | 36.35 | 34.16 |
| Methane | wt % | 0.38 | 0.62 | 0.90 | 1.29 |
| Ethylene | wt % | 4.22 | 4.89 | 6.52 | 6.66 |

Example 7

Figure 12:
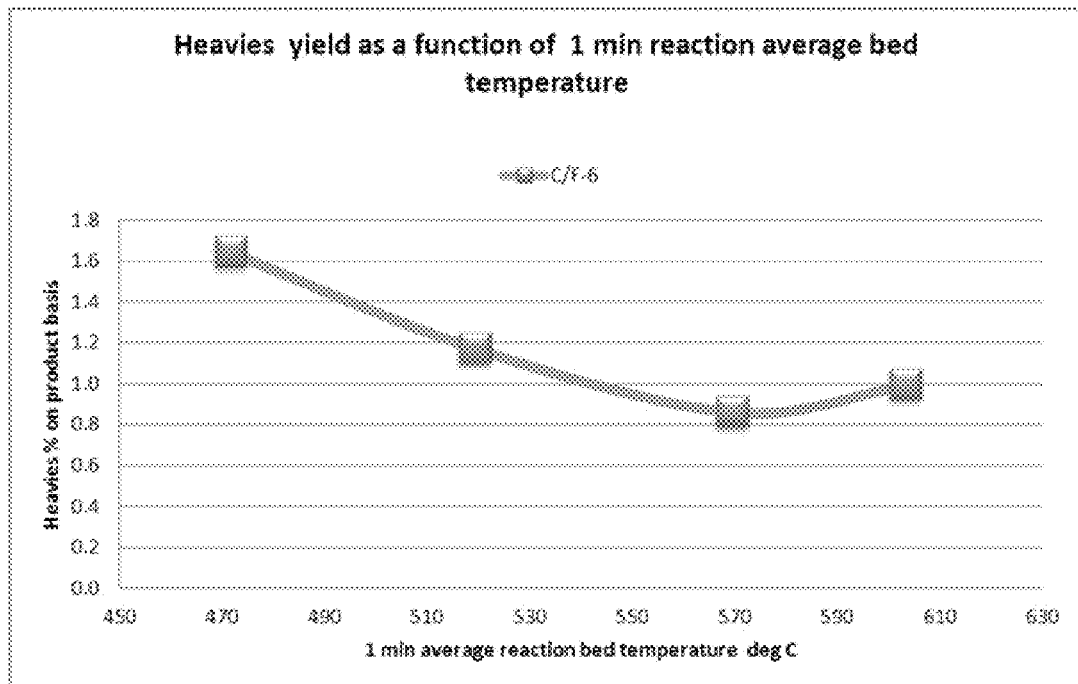
FIG. 12 is a plot of heavy liquid product yields as a function of one-minute average reactor bed temperatures in plastic pyrolysis conversion reactions using a specific catalyst composition.

Tests were conducted to determine the heavy liquid product yields (i.e., product boiling over 370° C.) based on the one-minute average reactor bed temperatures. The catalyst was composed of 37.5 wt. % ZSM-5 zeolite catalyst, with the remainder being spent FCC catalyst. A C/F ratio of 6 was used using 1.5 g of plastic feed and reaction bed temperature at start of reaction was varied from 600-700° C. to get a corresponding one-minute bed average temperature variation from 472-603° C. The fluidization $N_2$ flow used was 175N cc/min. The results are presented in Table 11 and FIG. 12. As can be seen from FIG. 12, yields of heavy liquid products are suppressed at a one-minute average reactor bed temperature of 570° C.

TABLE 11

| | Wt. % | Spent FCC(62.5%) + ZSM5 Zeolite Catalyst (37.5%) | Spent FCC(62.5%) + ZSM5 Zeolite Catalyst (37.5%) | Spent FCC(62.5%) + ZSM5 Zeolite Catalyst (37.5%) | Spent FCC(62.5%) + ZSM5 Zeolite Catalyst (37.5%) |
|---|---|---|---|---|---|
| | | Catalyst composition | | | |
| C/F ratio | g/g | 6.0 | 6.0 | 6.0 | 6.0 |
| Reaction temperature at start | ° C. | 600 | 635 | 670 | 700 |
| 1 min average reaction bed temperature | ° C. | 471.8 | 519.4 | 569.6 | 603.4 |
| Bone Dry catalyst fed | g | 8.95 | 8.95 | 8.95 | 8.95 |
| Feed weight transferred | g | 1.5 | 1.5 | 1.5 | 1.5 |
| Heavies yield | Wt. % | 1.64 | 1.17 | 0.86 | 0.99 |

Example 8

Figure 13:
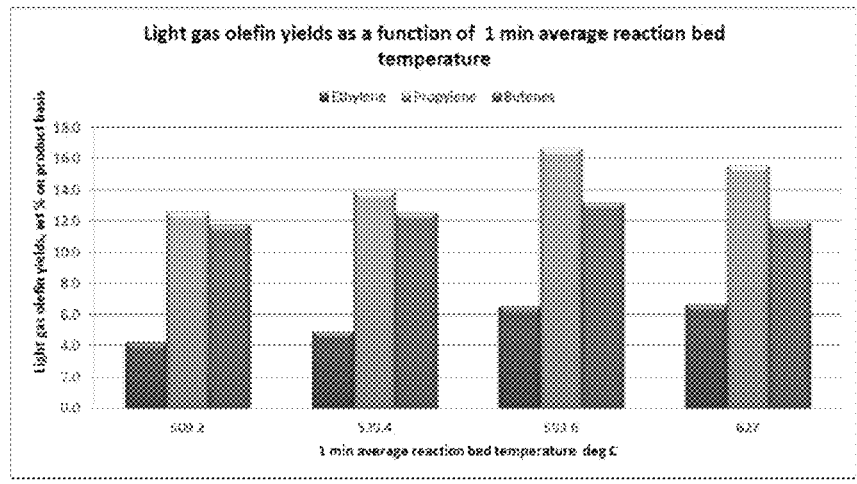
FIG. 13 is a plot of individual light gas olefin yields as a function of one-minute average reactor bed temperatures in plastic pyrolysis conversion reactions using a specific catalyst composition.

Tests were conducted to determine the individual light gas olefins yields based on the one-minute average reactor bed temperatures. The catalyst was composed of 37.5 wt. % ZSM-5 zeolite catalyst, with the remainder being spent FCC catalyst. A C/F ratio of 9 was used using 0.75 g of plastic feed. Fluidization $N_2$ flow used was 175N cc/min. The one-minute average reaction bed temperature varied from 509-627° C. The results are presented in Table 12 and FIG. 13. As can be seen from Table 12 below and FIG. 13, maximum yields were obtained at a one-minute average reactor bed temperature of 595° C.

TABLE 12

| | % | Spent FCC(62.5%) + ZSM5 Zeolite Catalyst (37.5%) | Spent FCC(62.5%) + ZSM5 Zeolite Catalyst (37.5%) | Spent FCC(62.5%) + ZSM5 Zeolite Catalyst (37.5%) | Spent FCC(62.5%) + ZSM5 Zeolite Catalyst (37.5%) |
|---|---|---|---|---|---|
| | | Additive | | | |
| C/F ratio | g/g | 9.0 | 7.0 | 9.0 | 9.95 |
| Reaction temperature at start | ° C. | 600 | 623 | 670 | 700 |
| 1 min average reaction temperature | ° C. | 509.2 | 539.4 | 593.6 | 627 |

TABLE 12-continued

| | | Additive | | | |
|---|---|---|---|---|---|
| | % | Spent FCC(62.5%) + ZSM5 Zeolite Catalyst (37.5%) | Spent FCC(62.5%) + ZSM5 Zeolite Catalyst (37.5%) | Spent FCC(62.5%) + ZSM5 Zeolite Catalyst (37.5%) | Spent FCC(62.5%) + ZSM5 Zeolite Catalyst (37.5%) |
| Bone Dry catalyst fed | g | 6.76 | 5.22 | 6.76 | 7.46 |
| Feed weight transferred | g | 0.75 | 0.75 | 0.75 | 0.75 |
| C4=, wt. % | | 11.77 | 12.54 | 13.21 | 11.89 |
| C3=, wt. % | | 12.59 | 13.90 | 16.62 | 15.61 |
| C2=, wt. % | | 4.22 | 4.89 | 6.52 | 6.66 |

Example 9

Figure 14:
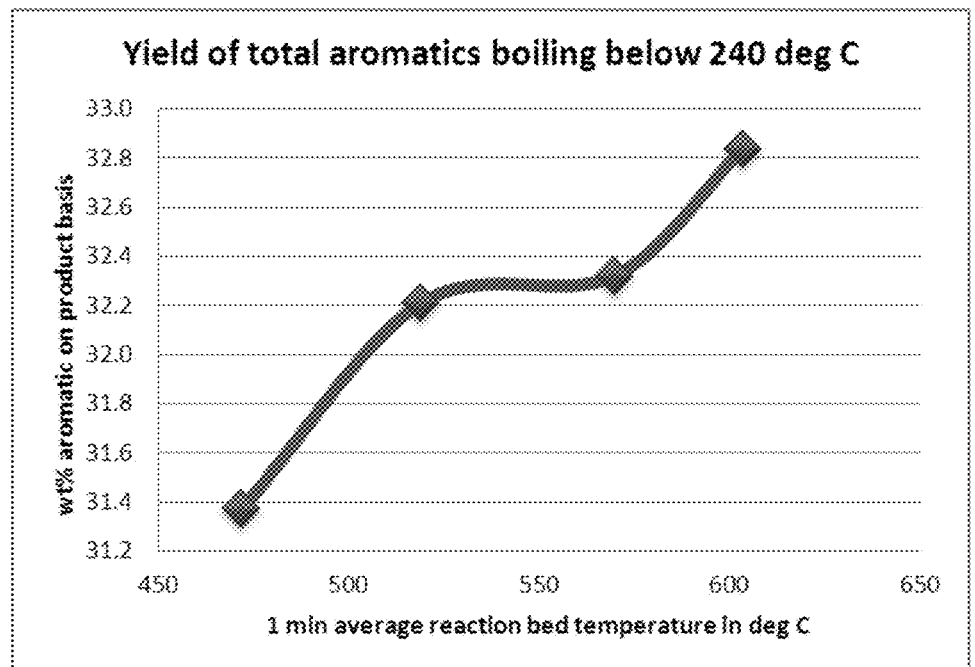
FIG. 14 is a plot of the total aromatic products as a function of one-minute average reactor bed temperatures in plastic pyrolysis conversion reactions using a specific catalyst composition.

Tests were conducted to determine the total aromatic product yields (i.e., aromatic hydrocarbon compounds boiling below 240° C.) based on the one-minute average reactor bed temperatures. The catalyst was composed of 37.5 wt. % ZSM-5 zeolite catalyst, with the remainder being spent FCC catalyst. The fluidization gas flow used was 175N cc/min of $N_2$. The one-minute average reaction bed temperature varied from 472-603° C. corresponding to a reaction temperature before start of reaction of 600-700° C. A C/F ratio of 6 was used using 1.5 g of plastic feed. The results are presented in Table 13 below and FIG. 14. As can be seen from FIG. 14, the overall aromatic products increased with increasing temperature. Thus, in the production of light gas olefins and aromatics, as the yield of light gas olefins increases, the temperature can be raised higher to also increase yields of aromatics. The temperature value when the light gas olefins begins to drop can therefore be used as the optimal temperature for the production of light gas olefins in combination with aromatic products.

TABLE 13

| Catalyst composition | 1 min average reaction bed temperature in ° C. | Dry catalyst fed, g | Feed weight transferred, g | Yield of total Aromatic products boiling below 240° C., wt % |
|---|---|---|---|---|
| Spent FCC(62.5%) + ZSM5 Zeolite Catalyst (37.5%) | 603.4 | 8.95 | 1.50 | 32.84 |
| Spent FCC(62.5%) + ZSM5 Zeolite Catalyst (37.5%) | 569.6 | 8.95 | 1.50 | 32.32 |
| Spent FCC(62.5%) + ZSM5 Zeolite Catalyst (37.5%) | 519 | 8.95 | 1.50 | 32.21 |
| Spent FCC(62.5%) + ZSM5 Zeolite Catalyst (37.5%) | 471.8 | 8.95 | 1.50 | 31.37 |

Example 10

Figure 15:
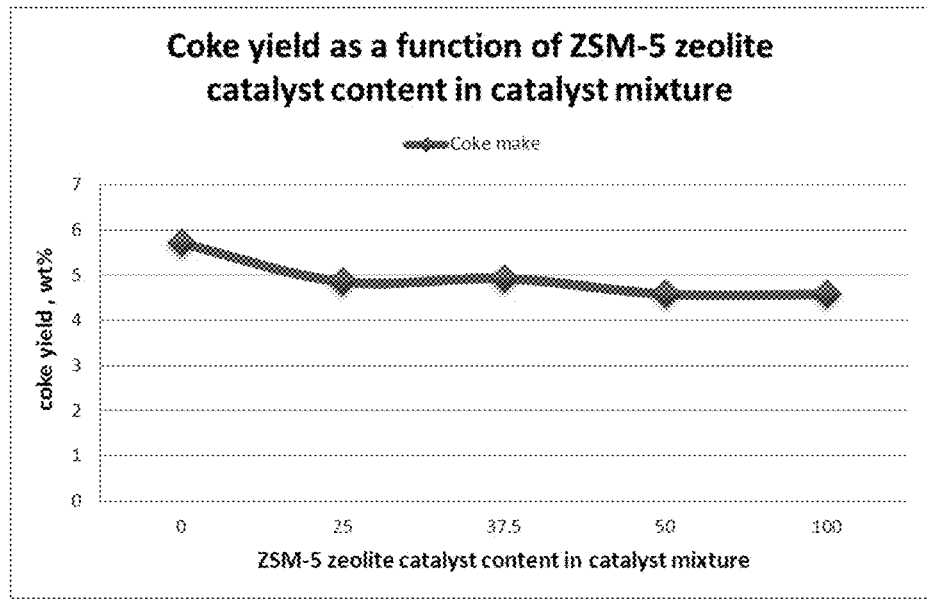
FIG. 15 is a plot of coke yields as a function of one-minute average reactor bed temperatures in plastic pyrolysis conversion reactions.

Tests were conducted to determine the coke yields based on the one-minute average reactor bed temperatures. The catalyst used was composed of 37.5 wt. % ZSM-5 zeolite catalyst, with the remainder being spent FCC catalyst. A C/F ratio of 9 was used using 0.75 g of plastic feed. The results are presented in Table 14 below and FIG. 15 As can be seen from Table 14 an FIG. 15, the coke yields vary in the region of 4 to 6 wt. %. This is similar to the typical coke yields encountered in normal and high severity FCC operations on petroleum feeds. From this it is evident that the coke formation in the present case is adequate to support the required heat balance that may be necessary in a large scale continuous flow and circulating reactors.

TABLE 14

| ZSM5 Zeolite catalyst in catalyst mixture containing FCC and ZSM5 zeolite catalysts | Wt % | 0 | 25 | 37.5 | 50 | 100 |
|---|---|---|---|---|---|---|
| C/F ratio | g/g | 9.1 | 9.0 | 9.0 | 9.0 | 8.9 |
| Reaction temperature at start | ° C. | 670 | 670 | 670 | 670 | 670 |
| Bone Dry catalyst fed | g | 6.80 | 6.77 | 6.76 | 6.75 | 6.70 |
| Feed weight transferred | g | 0.75 | 0.75 | 0.75 | 0.75 | 0.75 |
| Coke yield | wt % | 5.72 | 4.86 | 4.93 | 4.59 | 4.58 |

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of producing olefins and aromatic compounds from a feedstock, the method comprising:
   introducing a plastic feedstock and a catalyst composition comprising a fluidized catalytic cracking (FCC) catalyst and a ZSM-5 zeolite catalyst that is suitable for converting the feedstock to at least one of olefins and aromatic compounds within a reactor through pyrolysis, the amount of ZSM-5 zeolite catalyst of the catalyst composition making up from 10 wt. % to 50 wt. % of the total weight of the FCC catalyst and the ZSM-5 zeolite catalyst, the reactor having at least one inlet for introducing the feedstock and the catalyst composition and having at least one outlet for removing reaction products from the reactor that is spaced from the at least one inlet along a reactor flow path having a length L between the at least one inlet and at least one outlet;
   monitoring the temperature in the reactor at at least one location that is at or adjacent to said at least one inlet at a temperature-monitoring distance that is from 0.3 L or less from the at least one inlet, the monitored temperature being correlated to a desired product yield when the monitored temperature is maintained within a temperature range of from 450° C. to 730° C.; and
   in response to a change in one or more monitored temperatures from said at least one location, modifying one or more of the following parameters (a) through (d) to maintain the monitored temperature within the range of from 450° C. to 730° C. that is correlated to the desired product yield to simultaneously increase production of both light gas olefins and aromatics:
a) the relative amount of the fluidized catalytic cracking (FCC) catalyst and the ZSM-5 zeolite catalyst of the catalyst composition introduced into the at least one inlet;
b) the flow rate of the catalyst composition into the at least one inlet;
c) the flow rate of plastic feedstock into the at least one inlet; and
d) heat input to the reactor;
allowing at least a portion of the feedstock to be converted through pyrolysis to olefins and aromatic compounds within the reactor; and
removing a product stream containing at least one of olefins and aromatic compounds from the at least one outlet of the reactor.

2. The method of claim 1, wherein:
the parameter (a) is modified.

3. The method of claim 1, wherein:
monitoring the temperature includes monitoring the temperature in the reactor at at least two locations that are at or adjacent to said at least one inlet at a temperature-monitoring distance that is from 0.3 L or less from the at least one inlet, the at least two locations being spaced apart at least one of longitudinally or laterally from each other within the reactor.

4. The method of claim 3, wherein:
the at least two locations are spaced apart longitudinally.

5. The method of claim 3, wherein:
the at least two locations are spaced apart laterally.

6. The method of claim 1, wherein:
monitoring the temperature includes monitoring the temperature in the reactor at at least three locations that are at or adjacent to said at least one inlet at a temperature-monitoring distance that is from 0.3 L or less from the at least one inlet, the at least three locations being spaced apart at least one of longitudinally or laterally from each other within the reactor.

7. The method of claim 1, wherein:
monitoring the temperature includes monitoring the temperature at least one other location that is at a temperature-monitoring distance that is greater than 0.3 L from the at least one inlet.

8. The method of claim 1, wherein:
the temperature-monitoring distance is from 0.2 L or less from the at least one inlet.

9. The method of claim 1, wherein:
the temperature-monitoring distance is from 0.1 L or less from the at least one inlet.

10. The method of claim 1, wherein:
the plastic feedstock and catalyst composition are introduced into the at least one inlet as separate feeds.

11. The method of claim 1, wherein:
the plastic feedstock and catalyst composition are introduced into the at least one inlet as a mixture.

12. The method of claim 1, wherein:
the monitored temperatures from the at least one location are weighted and the weighted temperatures are correlated to a desired product yield and used in modifying the one or more parameters (a) through (d).

13. The method of claim 1, wherein:
the feedstock comprises at least one of polyolefins, polyethylene, polypropylene, polystyrene, polyethylene terephthalate (PET), polyvinyl chloride (PVC), polyamide, polycarbonate, polyurethane, polyester, natural and synthetic rubber, tires, filled polymers, composites, plastic alloys, and plastics dissolved in a solvent.

14. A method of producing olefins and aromatic compounds from a feedstock, the method comprising:
introducing a plastic feedstock and a catalyst composition within a reactor, the catalyst composition comprising a non-fresh fluidized catalytic cracking (FCC) catalyst and a ZSM-5 zeolite catalyst, wherein the amount of ZSM-5 zeolite catalyst is from 10 wt. % to 50 wt. % of the total weight of the FCC catalyst and the ZSM-5 zeolite catalyst, the reactor having at least one inlet for introducing the feedstock and the catalyst composition and having at least one outlet for removing reaction products from the reactor that is spaced from the at least one inlet along a reactor flow path having a length L between the at least one inlet and at least one outlet;
monitoring the temperature in the reactor at at least one location that is adjacent to said at least one inlet at a temperature-monitoring distance that is from 0.3 L or less from the at least one inlet, the monitored temperature being correlated to a desired product yield when the monitored temperature is maintained within a temperature range of from 450° C. to 730° C.; and
in response to a change in one or more monitored temperatures from said at least one location, modifying one or more of the following (a) through (d) to maintain the monitored temperature within the temperature range of from 450° C. to 730° C. that is correlated to the desired product yield to simultaneously increase production of both light gas olefins and aromatics:
a) the relative amount of the fluidized catalytic cracking (FCC) catalyst and the ZSM-5 zeolite catalyst of the catalyst composition introduced into the at least one inlet;
b) the flow rate of the catalyst composition into the at least one inlet;
c) the flow rate of feedstock into the at least one inlet; and
d) heat input to the reactor;
allowing at least a portion of the feedstock to be converted to olefins and aromatic compounds within the reactor; and
removing a product stream containing at least one of olefins and aromatic compounds from the at least one outlet of the reactor.

15. The method of claim 14, wherein:
monitoring the temperature includes monitoring the temperature in the reactor at at least two locations that are at or adjacent to said at least one inlet at a temperature-monitoring distance that is from 0.3 L or less from the at least one inlet, the at least two locations being spaced apart at least one of longitudinally or laterally from each other within the reactor.

16. The method of claim 15, wherein:
one or more of (a) through (d) are modified to maintain a weighted average temperature of the at least two locations of at least 550° C.

17. The method of claim 15, wherein:
one or more of (a) through (d) are modified to maintain a weighted average temperature of the at least two locations of from 450° C. to 730° C.

18. The method of claim 15, wherein:
the at least two locations are spaced apart longitudinally.

19. The method of claim 15, wherein:
the at least two locations are spaced apart laterally.

20. The method of claim 14, wherein:
monitoring the temperature includes monitoring the temperature in the reactor at at least three locations that are at or adjacent to said at least one inlet at a temperature-monitoring distance that is from 0.3 L or less from the at least one inlet, the at least three locations being spaced apart at least one of longitudinally or laterally from each other within the reactor.

21. The method of claim 14, wherein:
monitoring the temperature includes monitoring the temperature at at least one other location that is at a temperature-monitoring distance that is greater than 0.3 L from the at least one inlet.

22. The method of claim 14, wherein:
the temperature-monitoring distance is from 0.2 L or less from the at least one inlet.

23. The method of claim 14, wherein:
the temperature-monitoring distance is from 0.1 L or less from the at least one inlet.

24. The method of claim 14, wherein:
(a) the catalyst composition introduced into the at least one inlet is modified.

25. The method of claim 14, wherein:
the feedstock and catalyst composition are introduced into the at least one inlet as a mixture.

26. The method of claim 14, wherein:
the amount of ZSM-5 zeolite catalyst of the catalyst composition makes up from 30 wt. % to 45 wt. % of the total weight of the FCC catalyst and the ZSM-5 zeolite catalyst.

27. The method of claim 14, wherein:
the monitored temperatures from the at least one location are weighted and the weighted temperatures are correlated to a desired product yield and used in modifying the one or more parameters (a) through (d).

28. The method of claim 14, wherein:
the feedstock comprises at least one of polyolefins, polyethylene, polypropylene, polystyrene, polyethylene terephthalate (PET), polyvinyl chloride (PVC), polyamide, polycarbonate, polyurethane, polyester, natural and synthetic rubber, tires, filled polymers, composites, plastic alloys, and plastics dissolved in a solvent.

* * * * *